(12) United States Patent
Kolze et al.

(10) Patent No.: US 8,774,332 B2
(45) Date of Patent: Jul. 8, 2014

(54) CHARACTERIZING CHANNEL RESPONSE BASED ON COMPOSITE GAIN DETERMINATION

(75) Inventors: Thomas J. Kolze, Phoenix, AZ (US); Bruce J. Currivan, Dove Canyon, CA (US)

(73) Assignee: Broadcom Corporation, Irvine, CA (US)

( * ) Notice: Subject to any disclaimer, the term of this patent is extended or adjusted under 35 U.S.C. 154(b) by 1409 days.

(21) Appl. No.: 12/340,603

(22) Filed: Dec. 19, 2008

(65) Prior Publication Data

US 2009/0161782 A1 Jun. 25, 2009

Related U.S. Application Data

(60) Provisional application No. 61/008,564, filed on Dec. 21, 2007, provisional application No. 61/008,566, filed on Dec. 21, 2007.

(51) Int. Cl.
*H04L 1/00* (2006.01)

(52) U.S. Cl.
USPC ........... 375/346; 375/285; 375/340; 375/345; 455/63.1; 340/12.34

(58) Field of Classification Search
CPC ............ H04L 27/2647; H04L 27/3809; H04L 12/2602; H03G 3/3047; H04B 3/54; H04B 17/0042; H04B 17/009; H04N 5/52
USPC ......... 375/229–235, 260, 267–268, 316, 324, 375/345, 285, 340, 346; 348/678; 333/18; 455/63.1; 340/12.34
See application file for complete search history.

(56) References Cited

U.S. PATENT DOCUMENTS

| | | | | |
|---|---|---|---|---|
| 4,845,466 A | * | 7/1989 | Hariton et al. | 375/257 |
| 5,694,436 A | * | 12/1997 | Huang et al. | 375/345 |
| 5,751,766 A | * | 5/1998 | Kletsky et al. | 375/224 |
| 6,452,987 B1 | * | 9/2002 | Larsson et al. | 375/345 |
| 7,049,939 B2 | * | 5/2006 | Ikeda et al. | 340/12.39 |
| 7,729,462 B2 | * | 6/2010 | Ma et al. | 375/357 |
| 7,978,795 B2 | * | 7/2011 | Currivan et al. | 375/345 |
| 2003/0219085 A1 | * | 11/2003 | Endres et al. | 375/350 |
| 2006/0048202 A1 | * | 3/2006 | Bontempi et al. | 725/118 |
| 2008/0123786 A1 | * | 5/2008 | Wongwirawat et al. | 375/346 |
| 2008/0123787 A1 | * | 5/2008 | Wongwirawat et al. | 375/346 |
| 2009/0051458 A1 | * | 2/2009 | Miller et al. | 333/18 |

* cited by examiner

*Primary Examiner* — Sophia Vlahos
(74) *Attorney, Agent, or Firm* — Garlick & Markison; Shayne X. Short

(57) ABSTRACT

Based on tracked amplitude modulation (e.g., which may be hum modulation), compensation for amplitude modulation is applied across all orthogonal signal components of a non-time based orthogonal coded signal. Some examples of such non-time based orthogonal coded signals include an orthogonal frequency division multiplexing (OFDM) signal, a synchronous code division multiple access (S-CDMA) signal, or a code division multiple access (CDMA) signal, etc. The compensation may be applied to the signal across multiple frames, on a frame by frame basis, or intra-frame (i.e., changing and compensating differently within a frame). This compensation for amplitude modulation may be applied in conjunction with adaptive equalization in which different filter taps are applied to each respective orthogonal signal component of the signal. Also, automatic gain control (AGC) may be performed (e.g., before digital sampling) of a received signal in conjunction with the amplitude modulation compensation.

27 Claims, 13 Drawing Sheets

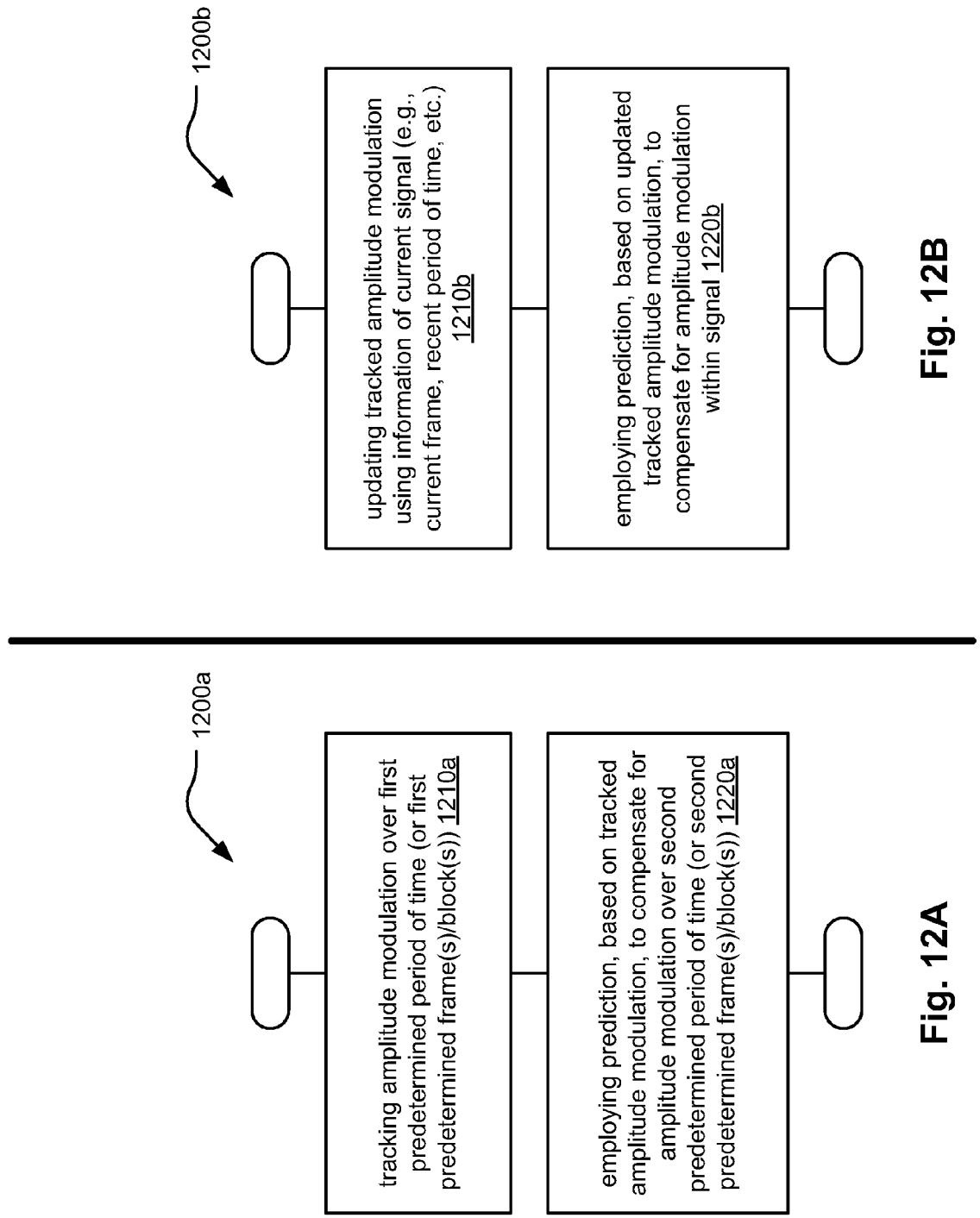

CHARACTERIZING CHANNEL RESPONSE BASED ON COMPOSITE GAIN DETERMINATION

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Application Ser. No. 61/008,564, entitled "Apparatus and method for characterizing channel response using data tone decision feedback," filed Dec. 21, 2007, pending.

2. U.S. Provisional Application Ser. No. 61/008,566, entitled "Apparatus and method for characterizing channel response based on composite gain determination," filed Dec. 21, 2007, pending.

Incorporation by Reference

The following U.S. Utility Patent Applications are hereby incorporated herein by reference in their entirety and made part of the present U.S. Utility Patent Application for all purposes:

1. U.S. Utility patent application Ser. No. 12/340,596, entitled "Characterizing channel response using data tone decision feedback," filed concurrently on Dec. 19, 2008, pending.

2. U.S. Utility patent application Ser. No. 10/112,567, entitled "Characterizing channel response in a single upstream burst using redundant information from training tones," filed Mar. 30, 2002, now U.S. Pat. No. 7,139,331 B2, issued on Nov. 21, 2006.

BACKGROUND OF THE INVENTION

1. Technical Field of the Invention

The invention relates generally to communication systems; and, more particularly, it relates to compensating for undesired amplitude modulation, such as may be caused by an interference source, within such communication systems.

2. Description of Related Art

Data communication systems have been under continual development for many years. Generally speaking, within the context of communication systems that employ various types of communication devices, there is a first communication device at one end of a communication channel with encoder capability and second communication device at the other end of the communication channel with decoder capability. In many instances, one or both of these two communication devices includes encoder and decoder capability (e.g., within a bi-directional communication system). Transferring information from one location to another can be applied generally within any type of communication system, including those that employ some form of data storage (e.g., hard disk drive (HDD) applications and other memory storage devices) in which data is processed and/or encoded before writing to the storage media, and then the data is processed and/or decoded after being read/retrieved from the storage media.

Certain communication systems employ one or more of various types of coding (e.g., error correction codes (ECCs) whose decoding may be performed iteratively) to ensure that the data extracted from a signal received at one location of a communication channel is the same information that was originally transmitted from another location of the communication channel. Communications systems with iterative codes are often able to achieve lower bit error rates (BER) than alternative codes for a given signal to noise ratio (SNR).

In addition, various types of communication systems may employ one or more of various types of signaling (e.g., orthogonal frequency division multiplexing (OFDM), code division multiple access (CDMA), synchronous code division multiple access (S-CDMA), time division multiple access (TDMA), etc.) to allow more than one user access to the communication system. Such signaling schemes may generally be referred to as multiple access signaling schemes.

In accordance with processing signals transmitted across a communication channel within such communication systems, one function that is oftentimes performed is that of channel estimation. From certain perspectives, channel estimation (sometimes alternatively referred to as channel detection, channel response characterization, channel frequency response characterization, etc.) is a means by which at least some characteristics of the communication channel (e.g., attenuation, filtering properties, noise injection, etc.) can be modeled and compensated for by a receiving communication device. While the prior art does provide some means by which channel estimation may be performed, there is an ever-present need for better and more efficient channel estimation approaches that intrude as minimally as possible in the maximum and overall throughput that be achieved for signals transmitted across a communication channel within a communication system.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 12A illustrates an embodiment of a method for performing compensation for undesired amplitude modulation within a signal.

FIG. 12B illustrates an alternative embodiment of a method for performing compensation for undesired amplitude modulation within a signal.

DETAILED DESCRIPTION OF THE INVENTION

Figure 1:
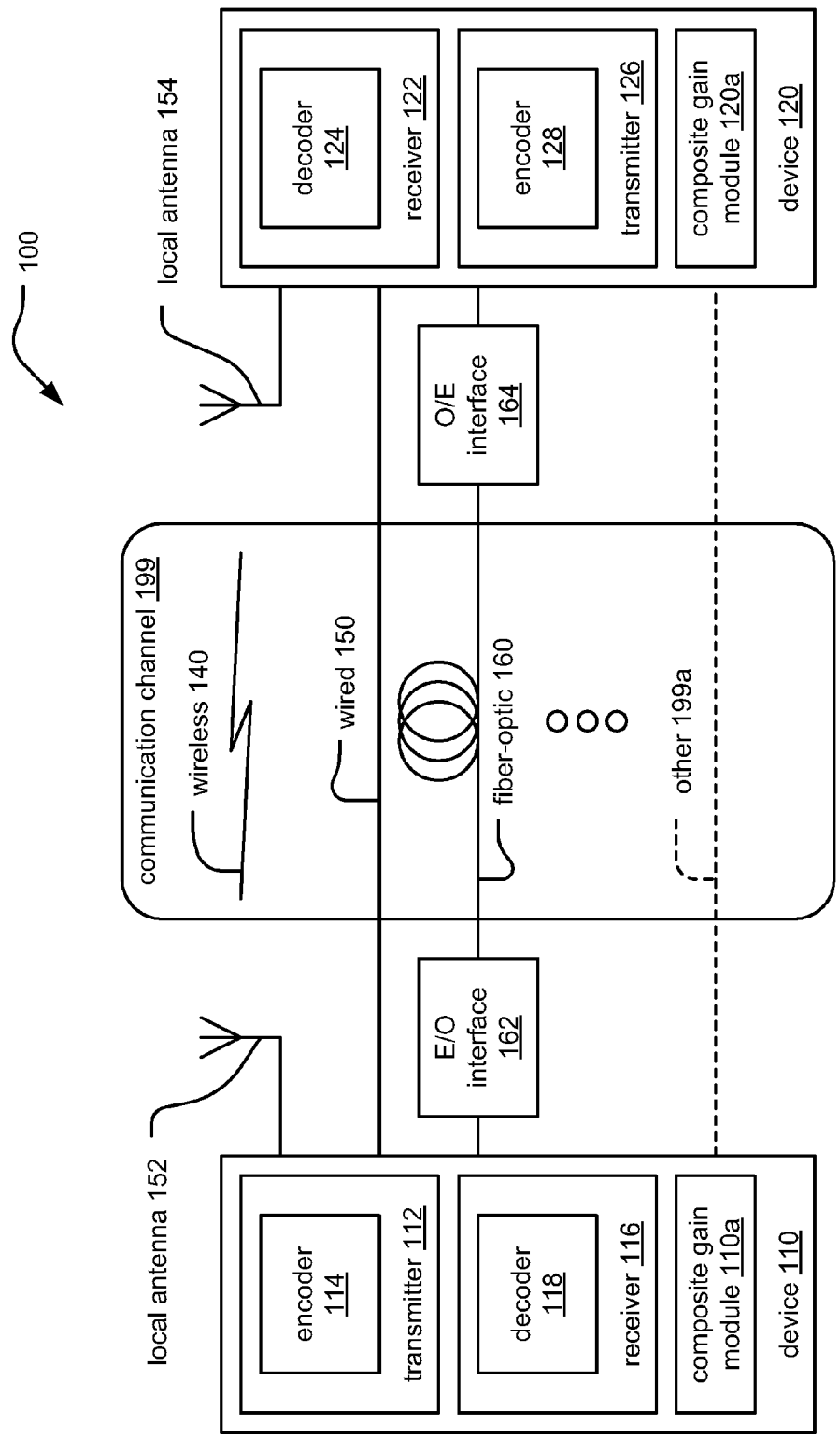
FIG. 1 and FIG. 2 illustrate various embodiments of communication systems.

In orthogonal frequency division multiplexing (OFDM), the channel estimation (e.g., alternatively referred to as channel frequency response characterization, channel frequency response estimation, channel detection, etc.) of a communication channel is generally estimated so that its results may be applied to each data tone (DT) within the OFDM signal (that may also include pilot tones (PTs therein)), in order to adjust the gain and phase of the received data tone for slicing (e.g., assuming some order of quadrature amplitude modulation (QAM) modulation on the tones, such as quadrature phase key shifting (QPSK)/4 QAM, 16 QAM, 64 QAM, 256 QAM, 1024 QAM, or other QAM orders (e.g., even higher) or even different modulation types, such as 8 PSK, which may have even a higher order of modulation).

If pulse amplitude modulation (PAM) is employed as the modulation scheme, then only gain adjustment (as determined from channel estimation) is needed. The channel frequency response, if static, requires sampling in the frequency domain (by sampling the pilot tones (PTs) [alternatively referred to as training tones (TTs)] within the signal), to estimate the frequency response (or equivalently, the time domain impulse response), across the entire communication channel.

The spacing of the PTs (in the frequency domain) needs to be sufficiently close to satisfy the sampling theorem (e.g., Nyquist theorem), depending on the length of the pertinent amount of energy in the impulse response. However, the closer that the PTs are spaced, then the less efficient is the use of the time-frequency dimensions available for signaling (data transmission); this directly can reduce the overall throughput of a signal transmitted across the communication channel.

Using more PTs than required, by sampling theory, also inherently reduces the efficiency of the transmission, but it may improve the channel estimation (by providing more samples, allowing reduction of noise variance). If the channel frequency response is time-varying (dynamic), then averaging the channel estimation over time may also become problematic. Therefore, the dynamics of the changing channel response (which consequently makes for changing/varying channel estimates/estimations) must be balanced against the noise smoothing in determining the way in which multiple OFDM frames (or other multiple OFDM signal portions) are weighted if more than one frame is used for channel estimation.

Various forms of interferences may deleteriously affect the pilot tones and introduce a gain change that is rapidly varying compared to other changes in the channel in cable system applications, but such interference may also be common to all tones across the channel. One such form of deleterious interference may be that of amplitude modulation of a signal, and one such type of amplitude modulation may be hum modulation (e.g., such as that incurred by various electronic devices within a communication system that perform some type of signal rectification of an alternating current (AC) signal thereby generating a direct current (DC) signal). This hum modulation oftentimes has certain frequency components that are integer multiples of the power system frequency (e.g., hum modulation at 120 Hertz (Hz) in North America, and oftentimes 100 Hz in other regions of the world, based on power system frequencies of 60 Hz and 50 Hz, respectively).

By isolating this common component of the gain on each data tone, from the rest of the channel estimate, a much longer smoothing time (e.g., more frames or more of a signal) can be applied to estimating the remainder of the channel response. Referring back to hum modulation, since the hum component is common to all the tones (e.g., all PTs and DTs), every PT can be used to smooth the deleterious effects of hum modulation. Also, since the hum frequency is typically known (e.g., 120 Hz or 100 Hz), this 'a priori' knowledge can be used to improve further the channel estimation and compensation of this component.

In one embodiment, errors which may exist within a channel estimate may be eliminated and/or reduced using various approaches presented herein, and their equivalents. By providing a means to improve slicer performance, reduction of any channel estimation error may be achieved. In one embodiment, this allows for a much better performance within relatively slowly changing communication channel (relatively predictable and stable communication channels such as within wire-based systems). However, for applications within communication systems whose communication channels may be rapidly changing (e.g., wireless, satellite, etc.), the channel estimation may nonetheless still be significantly improved using various approaches presented herein, and their equivalents. This improvement in channel estimation may be achieved without increasing the inefficiency of PTs and may be viewed as a universal advantage for a wide variety of communication systems.

Various approaches presented herein improve on the performance of the channel estimation in any receiving communication device (e.g., a downstream receiver). Significant degradation in throughput, performances, etc. can be avoided by implementing at least one of the embodiments, or its equivalent, as presented herein. It is also possible to use more frames (or more signal portions) to estimate the channel frequency response, since the rapid gain changes due to certain types of amplitude modulation (e.g., hum modulation) may be tracked and compensated for using a separate gain term and/or filter tap.

Considering one type of communication system, namely, a cable system, when utilizing OFDM modulation, some characteristics that govern and drive performance of such a communication system are channel estimation (e.g., employed for setting slicer gain for each data tone) and phase noise. In cable systems, a desired goal for data tone to pilot tone ratio/spacing oftentimes approaches the efficiency of 31/32 (e.g., 31 data tones for each 1 pilot tone in a 32 tone signal portion). These tones may be spaced apart by some predetermined frequency range (e.g., 333 kilo-Hz (kHz)) to ensure adequate sampling of the spectrum. In one embodiment, this is in turn derived from the 1.5 micro-second impulse response duration. It follows from the Nyquist sampling theory, combined with the channel model for the impulse response, that the sampling of the frequency domain must be at least 333 kHz. The close tone spacing of 10.4 kHz (based on 333 kHz/32 tones) puts severe pressure on the phase noise performance, which may introduce significant degradation into the communication channel/link.

Channel estimation is required to set the phase and gain for slicing the data tones. Accuracy is very critical, of course, for high order and higher density modulation signals (e.g., 64 QAM, 256 QAM, 1024 QAM, or even higher modulation order).

One embodiment, that operates on an OFDM signal, employs a decision-feedback based approach, and it relies on past/previous pilot tones plus the hard decisions made on at least one of the data tones (or any number of data tones including up to all of the data tones). Since the channel estimate is generally highly correlated for closely spaced data tones, the decision feedback approach can benefit from and capitalize upon this correlation to identify likely symbol decision errors. These may then be eliminated from contributing to the channel estimation (thereby reducing any error in the channel estimate). In other words, once the slicer determination is made, then an output constellation data point will result for each OFDM channel. This constellation data point can be compared with the input constellation data point (assuming gross phase alignment) to determine an error vector between the output constellation data point and the input constellation data point. The error vector can be used to define any error in the channel estimate (e.g., to characterize the channel), if the output constellation data point is assumed (at least temporarily) to be correct. For example, if the input constellation data point is 2% below in amplitude from slicer output constellation data point, then the 2% attenuation can be attributed to the channel characteristic.

As can be seen, the actual slicer output data points (e.g., from data tones) are employed in addition to hard decisions from pilot tones for performing channel estimation. From another perspective, it may be seen that data tone hard decisions (and/or their associated error terms as generated by a slicer) are employed in cooperation with pilot hard decisions (and/or their associated error terms as generated by the slicer) to effectuate an improved channel estimate.

In some embodiments, this is particularly beneficial because there may be significantly more data tones than pilot tones within an OFDM signal. As such, a more robust channel estimate can be achieved.

Within cable systems, automatic gain control (AGC) may be another major design concern in downstream communications. AGC can be considered as being related to the channel estimation at each data tone within an OFDM signal, and the setting of the gain in accordance with AGC may be employed to assist in eventual slicing for each data tone.

However, in downstream communications within a cable system, the gain variation occurs for the entire channel due to different mechanisms than drive the shaping of the frequency response, so this is a separable and severable problem in downstream communications within a cable system. For example, not only does the gain change in the downstream cable plant as temperature variations impact the amplifiers, routers, splitter, switches, fiber optics, etc., but also there is amplitude modulation (e.g., hum modulation as referenced above) that can be impressed onto the composite downstream waveform.

Without specific mitigation of this undesirable amplitude modulation (e.g., hum modulation), relatively high modulation order constellations (e.g., relatively high density QAM constellations, or other shaped constellations) that are employed in concert with OFDM will be severely impacted. This is because, from the time-domain dynamics of this gain change (e.g., amplitude modulation or hum modulation), the number of frames over which the pilot tones may be measured and averaged to set the gain appropriately is limited.

The "fading" rate for a communication channel (particularly in a cable system context) should also be considered, and particularly, the rate at which even small gain changes may occur. In the past, within various standards bodies that operate in cooperation with the IEEE in accordance with the development of standards, the gain changes described therein have been of many dB over a period of time that is as short as a few minutes. This has been attributed, at least in part, to sun exposure that has replaced shadowing in outdoor housings. While this assessment presents a relatively benign rate of change (preliminary assessment), other mechanisms may also introduce a significant and rapid change in both gain and frequency response, with channel scanning of other sets connected to the same cable having the capability to alter the echo profile that is presented to the receiving device.

Referring again to AGC, the AGC employed for relatively high modulation order constellations (e.g., relatively high-density modulation QAM) inherently must be able to withstand such drastic changes. Single-carrier high-density QAM may be effective in a cable system with equalization and AGC compensation approaches, but the application to multi-carrier applications operating using OFDM is not necessarily as straightforward. For example, even relatively small changes in the channel estimate (e.g., frequency response of the channel) at some small range of the overall channel frequency expanse could severely impact one or a few data tones and impair the overall link unacceptably in an OFDM application.

One goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and/or other types of media (or combinations thereof) as well.

Figure 2:
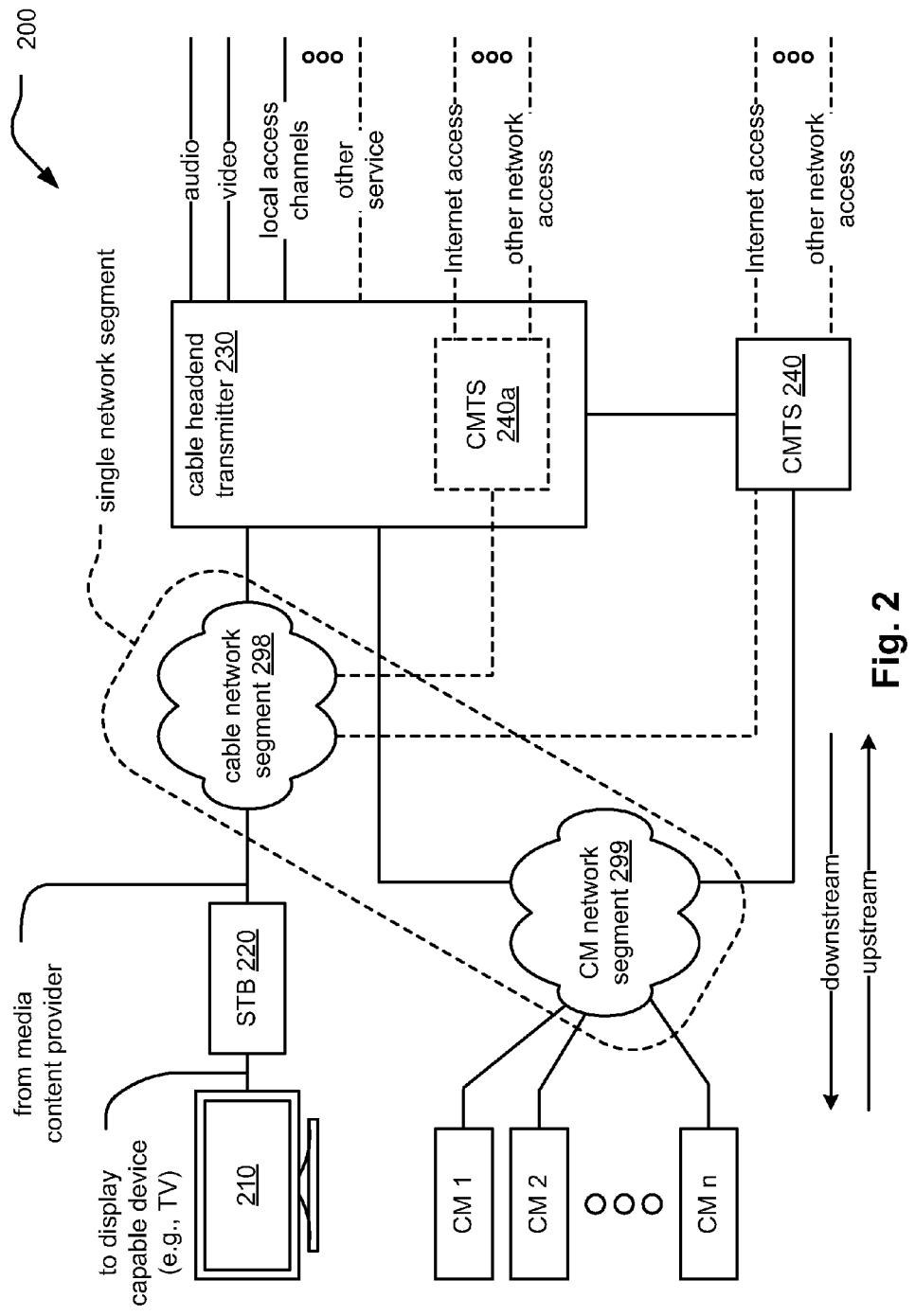

FIG. 1 and FIG. 2 are diagrams which illustrate various embodiments of communication systems, 100 and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver.

There are several different types of media by which the communication channel 199 may be implemented (e.g., a wireless communication channel 140 using local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

To reduce transmission errors that may undesirably be incurred within a communication system, error correction and channel coding schemes are often employed. Generally, these error correction and channel coding schemes involve the use of an encoder at the transmitter and a decoder at the receiver.

The communication device 110 includes a composite gain module 110a that is capable to perform functionality of at least one of the embodiments described herein. Also, the communication device 120 includes a composite gain module 120a that is also capable to perform functionality of at least one of the embodiments described herein. Each of the modules 110a and 120a may operate independently within its respective communication device, or they may operate in cooperation with one another.

It is noted that while this embodiment of communication system 100 includes communication devices 110 and 120 that include both transmitter and receiver functionality, clearly, communication device 110 could include only transmitter functionality and communication device 120 could include only receiver functionality, or vice versa, to support uni-directional communication (vs. bi-directional communication) in alternative embodiments.

Any of a variety of types of coded signals (e.g., turbo coded signals, turbo trellis coded modulation (TTCM) coded signal, LDPC (Low Density Parity Check) coded signals, Reed-Solomon (RS) coded signal, and/or any combination of such coded signals, etc.) can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Referring to the communication system 200 of FIG. 2, this communication system 200 may be viewed particularly as being a cable system. For example, the communication system 200 includes a number of cable modems (shown as CM 1, CM 2, and up to CM n). A cable modem network segment 299 couples the cable modems to a cable modem termination system (CMTS) (shown as 240 or 240a and as described below).

A CMTS 240 or 240a is a component that exchanges digital signals with cable modems on the cable modem network segment 299. Each of the cable modems coupled to the cable modem network segment 299, and a number of elements may be included within the cable modem network segment 299. For example, routers, splitters, couplers, relays, and amplifiers may be contained within the cable modem network segment 299.

The cable modem network segment 299 allows communicative coupling between a cable modem (e.g., a user) and the cable headend transmitter 230 and/or CMTS 240 or 240a. Again, in some embodiments, a CMTS 240a is in fact contained within a cable headend transmitter 230. In other embodiments, the CMTS is located externally with respect to the cable headend transmitter 230 (e.g., as shown by CMTS 240). For example, the CMTS 240 may be located externally to the cable headend transmitter 230. In alternative embodiments, a CMTS 240a may be located within the cable headend transmitter 230. The CMTS 240 or 240a may be located at a local office of a cable television company or at another location within a cable system. In the following description, a CMTS 240 is used for illustration; yet, the same functionality and capability as described for the CMTS 240 may equally apply to embodiments that alternatively employ the CMTS 240a. The cable headend transmitter 230 is able to provide a number of services including those of audio, video, local access channels, as well as any other service of cable systems. Each of these services may be provided to the one or more cable modems (e.g., CM 1, CM2, etc.). In addition, it is noted that the cable headend transmitter 230 may provide any of these various cable services via cable network segment 298 to a set top box (STB) 220, which itself may be coupled to a television 210 (or other video or audio output device). While the STB 220 receives information/services from the cable headend transmitter 230, the STB 220 functionality may also support bi-directional communication, in that, the STB 220 may independently (or in response to a user's request) communicate back to the cable headend transmitter 230 and/or further upstream.

In addition, through the CMTS 240, the cable modems are able to transmit and receive data from the Internet and/or any other network (e.g., a wide area network (WAN), internal network, etc.) to which the CMTS 240 is communicatively coupled. The operation of a CMTS, at the cable-provider's head-end, may be viewed as providing analogous functions provided by a digital subscriber line access multiplexor (DSLAM) within a digital subscriber line (DSL) system. The CMTS 240 takes the traffic coming in from a group of customers on a single channel and routes it to an Internet Service Provider (ISP) for connection to the Internet, as shown via the Internet access. At the head-end, the cable providers will have, or lease space for a third-party ISP to have, servers for accounting and logging, dynamic host configuration protocol (DHCP) for assigning and administering the Internet protocol (IP) addresses of all the cable system's users (e.g., CM 1, CM2, etc.), and typically control servers for a protocol called Data Over Cable Service Interface Specification (DOCSIS), the major standard used by U.S. cable systems in providing Internet access to users. The servers may also be controlled for a protocol called European Data Over Cable Service Interface Specification (EuroDOCSIS), the major standard used by European cable systems in providing Internet access to users, without departing from the scope and spirit of the invention.

The downstream information flows to all of the connected cable modems (e.g., CM 1, CM2, etc.). The individual network connection, within the cable modem network segment 299, decides whether a particular block of data is intended for it or not. On the upstream side, information is sent from the cable modems to the CMTS 240; on this upstream transmission, the users within the group of cable modems to whom the data is not intended do not see that data at all. As an example of the capabilities provided by a CMTS, a CMTS will enable as many as 1,000 users to connect to the Internet through a single 6 Mega-Hertz (MHz) channel, 8 MHz channel, or an even wider bandwidth channel. Since a single channel is capable of 30-40 Mega-bits per second of total throughput (e.g., currently in the DOCSIS standard, but with higher rates envisioned such as those sought after in accordance with the developing DVB-C2 (Digital Video Broadcasting—Second Generation Cable) standard, DVB-T2 (Digital Video Broadcasting—Second Generation Terrestrial) standard, etc.), this means that users may see far better performance than is available with standard dial-up modems.

Some embodiments implementing the invention are described below and in the various Figures that show the data handling and control within one or both of a cable modem and a CMTS within a cable system, or any other type of communication device implemented within any type of communication system (e.g., see FIG. 1), that operates by employing any type of non-time based orthogonal coded signal. In other words, any non-time based orthogonal signaling system (e.g., orthogonal frequency division multiplexing (OFDM), synchronous code division multiple access (S-CDMA), code division multiple access (CDMA), etc.) may operate in accordance with the various aspects presented herein.

The cable modems, the STB 220, the cable headend transmitter 230, and/or the CMTS 240 (or 240a) may perform compensation for amplitude modulation (using prediction in some embodiments) in accordance with any of the various aspects described herein, including by employing a composite gain module therein. As with the previous embodiment of FIG. 1, composite gain modules implemented within different components within FIG. 2 may also operate in cooperation with one another.

Moreover, it is noted that the cable network segment 298 and the cable modem network segment 299 may actually be the very same network segment in certain embodiments. In other words, the cable network segment 298 and the cable modem network segment 299 need not be two separate network segments, but they may simply be one single network segment that provides connectivity to both STBs and/or cable modems. In addition, the CMTS 240 or 240a may also be coupled to the cable network segment 298, as the STB 220 may itself include cable modem functionality therein.

Figure 3:
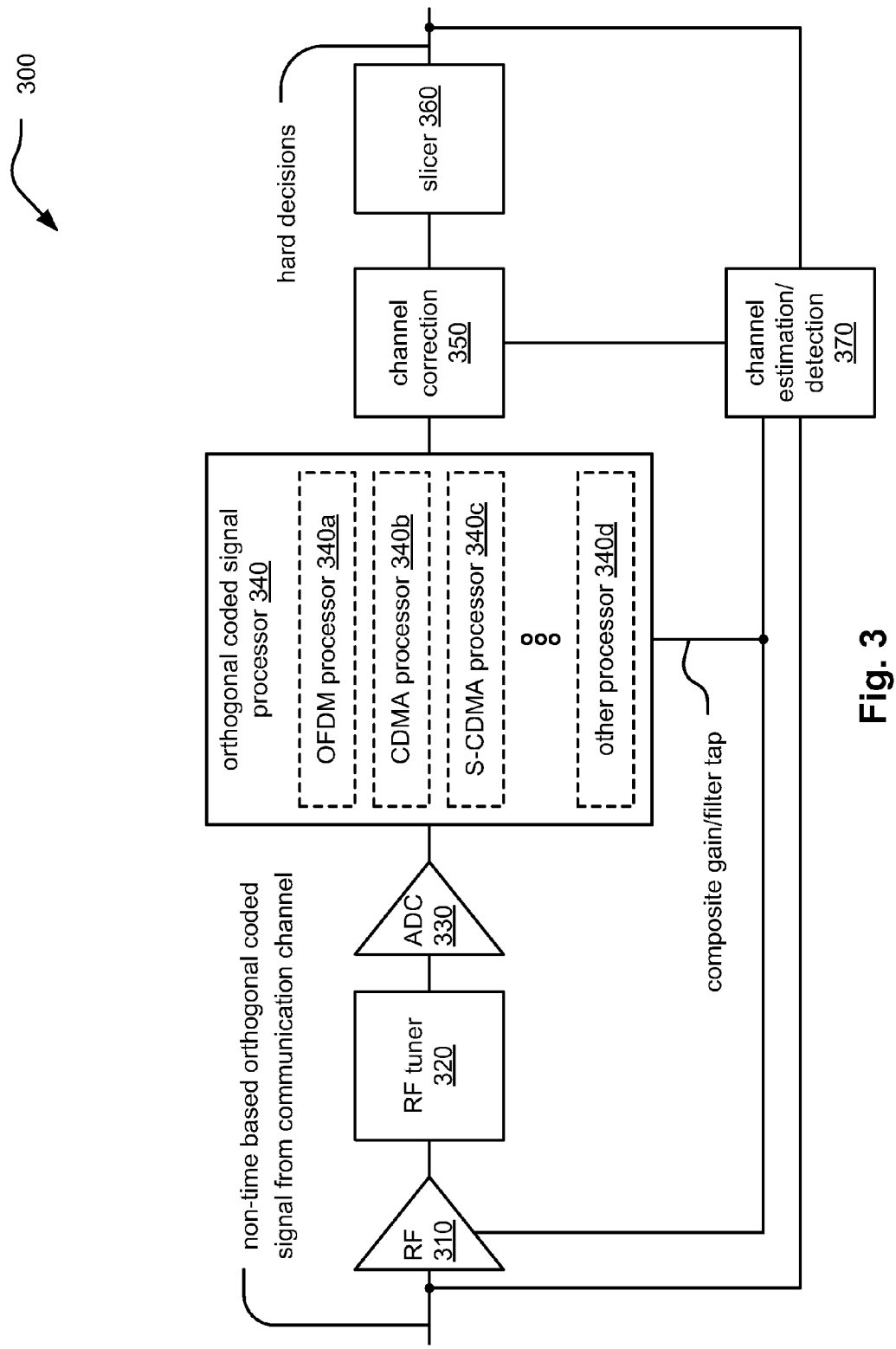
FIG. 3 illustrates an embodiment of an apparatus that processes a non-time based orthogonal coded signal to effectuate compensation for undesired amplitude modulation.

FIG. 3 illustrates an embodiment of an apparatus that processes a non-time based orthogonal coded signal to effectuate compensation 300 for undesired amplitude modulation.

A non-time based orthogonal coded signal is received from a communication channel and is processed initially by a radio frequency (RF) module 310, which may perform gain adjustment thereto. The non-time based orthogonal coded signal may be generated using any of a variety of orthogonal signaling schemes whose orthogonal signal component is not time based. Some examples of such non-time based orthogonal coded signal include those generated in accordance with orthogonal frequency division multiplexing (OFDM), code division multiple access (CDMA), synchronous code division multiple access (S-CDMA), etc. Time-based orthogonal signaling means that signal dimensions increase by an increment or one (e.g., using pulse amplitude modulation (PAM)) or by two (e.g., using QAM) as time progresses. In comparison, in non-time based orthogonal systems, many signaling dimensions are accrued simultaneously with the addition of each new signal portion (e.g., frame).

Again, this non-time based orthogonal coded signal is received from a communication channel and is processed initially by the RF module 310, which may perform gain adjustment thereto, and the signal output from the RF module 310 is provided to an RF tuner 320 to select the appropriate signal portion (e.g., in terms of tuned frequency) intended for the apparatus 300. Thereafter, digital sampling (e.g., such as by an analog to digital converter (ADC) 330) generates a discrete time signal (e.g., a digital signal) from the signal output from the RF tuner 320. An orthogonal coded signal processor 340 performs appropriate processing of its received signal to extract the appropriate signal portion intended for the apparatus 300. For example, the orthogonal coded signal processor 340 may be implemented as an OFDM processor 340a that performs appropriate processing of its received signal to extract the appropriate signal portion intended for the apparatus 300. Alternatively, the orthogonal coded signal processor 340 may alternatively be implemented as a CDMA processor 340b, or an S-CDMA processor 340c, that employs an appropriate code to extract the appropriate signal portion intended for the apparatus 300. Generally speaking, the orthogonal coded signal processor 340 may alternatively be implemented generally as any other processor 340d (that employs the appropriate non-time based orthogonal signaling scheme to extract the appropriate signal portion intended for the apparatus 300).

A channel correction module 350 employs a channel estimate (e.g., such as a predetermined channel estimate, a channel estimate provided by channel estimation/detection module 370, etc.) to try to compensate for any deleterious channel induced effects.

In this embodiment, output hard decisions from a slicer 360, that is coupled to the channel correction module 350, are fed back to the channel estimation/detection module 370. The output of the slicer 360, for each data tone, is fed back to the channel estimation/detection module 370 for comparison with the input OFDM signal to determine the channel estimate (e.g., the channel impulse response). As referred above, if the error vector is determined to be too large, above a certain threshold, then the error term can be weighted or thrown out completely.

It is noted that the channel estimate (e.g., of channel frequency response) is improved by using the qualified symbol decisions to "back out" or compute the slicer error on a data tone, if any, and the complex ratio of the received signal to the hard decision value comprises a channel estimate sampled at the frequency of the data tone. A new and improved channel estimate can be computed with much more data samples, thus reducing any variance that may be attributed to thermal noise. Of course, symbol errors are considered, since they may operate to increase the error in the channel estimate when they do in fact occur in such a decision feedback scheme.

By comparing the raw "channel estimate/frequency response estimate+noise" in adjacent data tones (and nearly adjacent, and so on), and by realizing that the channel estimate generally does not vary greatly for adjacent data tones, symbol errors may be identified immediately, and these potentially erroneous symbols may be excluded (at a minimum) from the channel estimation (frequency response estimation process) thereby improving channel estimates for use compensating for channel effects incurred within a signal transmitted across a communication channel.

Various means and embodiments are presented herein to compensate for the deleterious effects of amplitude modulation (e.g., hum modulation in some embodiments) that may be that may be existent in a single-carrier communication receiver. This may be effectuated by separating the compensation for this undesirable amplitude modulation (e.g., hum modulation) by employing a single composite gain or filter tap that is separate and distinct from any other gain coefficients or filter taps such as those which may be applied in a channel correction module (which may be implemented as an adaptive equalizer).

By applying this composite gain or filter tap to OFDM or any other non-time based orthogonal coded signal (e.g., a CDMA signal, an S-CDMA signal, etc.), the undesirable amplitude modulation (e.g., hum modulation) may be compensated for (tracked and compensated) with its own composite gain or filter tap that operates separately and distinctly from the channel estimates on each of the data tones of the signal. In the context of other non-time based orthogonal coded signal (e.g., a CDMA signal, an S-CDMA signal, etc.), the composite gain or filter tap would operate separately and distinctly from the channel estimates on each of the other corresponding orthogonal signal components within the signal. To provide stability in the channel and gain compensation, the overall gain of the estimated channel response is normalized separately from the gain compensation tap. In an alternative embodiment, that gain compensation tap may be further separated into two taps. For example, one tap may be responsive to a high rate of change/fluctuation, and another tap may be responsive to only a low rate of change/fluctuation, thus providing separation and stability for the control, while also allowing different amounts of averaging or other tuned processing to guide each tap's respective value. Separation of gain compensation into multiple taps may alternatively be based on responsive to first selected frequencies (e.g., 120 Hz and its harmonics) and second selected frequencies (e.g., other than 120 Hz and its harmonics).

Many wireless communication system applications operate using OFDM signaling and other non-time based orthogonal coded signals. However, in the context of cable systems that employ some analogous non-time based orthogonal coded signals (such as OFDM), unlike the more familiar OFDM application to wireless technology, the amplitude modulation (e.g., hum modulation) may be the dominant source of rapid variation in the channel estimate. Even in wireless applications, wired subsystems, such as the transmitters and receivers themselves, may introduce some hum modulation, which may be a significant impairment as higher density constellations are introduced. Other frequency-independent (across a channel's spectrum) mechanisms exist in wireless channels, known as "flat fading," which will benefit from the separate gain estimation and compensation.

Herein, means are presented by which the amplitude modulation (e.g., hum modulation) is compensated across an entire set of orthogonal signal components. In the context of OFDM, this composite gain or filter tap is applied to an entire set of tones within an OFDM signal. This may involve generating this composite gain or filter tap from all pilot tones within an OFDM signal. Alternatively, this may involve generating this composite gain or filter tap from all pilot tones as well as some or all of the data tones within an OFDM signal. If desired, certain qualified data tones (e.g., as identified as being pseudo-pilot tones as described herein) may be employed with feedback, so much more averaging can be brought to bear on this impairment in a much shorter time. Further, the frequency response estimation on the individual data tones may now employ many more frames for averaging, since the hum modulation is now removed separately, and since in many cable plants the remaining portion of the frequency response may involve very slow dynamics.

Referring again to the diagram, this composite gain or filter tap may be included off of the orthogonal coded signal processor 340 (e.g., off of OFDM processor 340a in an OFDM application), and it may be used for RF gain adjustment of the RF module 310 at the input of the apparatus 300.

This way, all orthogonal signal components (e.g., tones in an OFDM context) are adjusted based on the composite gain or filter adjustment. Alternatively, the composite gain or filter gain adjustment could be done after the RF module 310, and it could even be performed in digital sampling (i.e., analog to digital conversion) within an analog front end module of a communication device.

Accordingly, this diagram shows one embodiment where both the output of the slicer 360 and the composite gain or filter tap operate in cooperation to formulate the channel estimate as performed by channel estimation/detection module 370. This generated channel estimate may be utilized by the channel correction module 350 prior to slicer detection, as shown in the diagram.

Further, channel estimation on the individual orthogonal signal components (e.g., tones in an OFDM context) may employ multiple frames or signal portions for averaging (including weighted averaging). This may be achieved, at least in part, because, the amplitude modulation (e.g., hum modulation) is now removed separately, and since in many cable plants the remaining portion of the channel estimate (frequency response) may involve very slow dynamics (i.e., the communication channel is relatively static/non-changing). Accordingly, a single composite gain determination for all of the orthogonal signal components (e.g., all of the tones in an OFDM context) can be calculated based on averaging or combining the AGC values of each individual pilot tones. As can be seen, the composite gain or filter gain adjustment described herein can in fact operate in cooperation with AGC (and also in cooperation with adaptive equalization) in various embodiments.

In doing so, the individual orthogonal signal components (e.g., tones in an OFDM context) whose corresponding AGC values indicate a significant amount of adjustment or attenuation can be excluded from the average, or they may be weighted appropriately in accordance with weighted averaging so as to reduce their overall effect. The single composite gain or filter tap measurement from multiple orthogonal signal components (e.g., tones in an OFDM context) can be tracked/monitored over several frames of data, so that gain variations can be tracked/compensated for over time (i.e., including multi-frame compensation and/or intra-frame compensation for undesirable amplitude modulation). Further, this is effectuated by taking account of the amplitude or hum modulation effects on the amplitude of the signal of interest.

In one embodiment illustrative of the compensation of gain variation in OFDM (i.e., one type of orthogonal signaling that may be employed), after applying gain correction 350 (which is equivalent to computing the complex ratio of the received tone value with the channel estimate at the tone frequency), each PT would be received at complex value (1,0) without impairments. Of course, it is noted that alternative embodiments could employ PTs having different values as well.

With impairments the channel gain estimate and frequency variation estimates are not perfect, so that a value at a pilot tone or pseudo-pilot tone "a1" may be $(x_{a1}, y_{a1})$, and similarly for pilot tone or pseudo-pilot tone "a2", and so on. Pseudo-pilot tones will be received at their corresponding DT constellation points (after applying the channel estimate compensation for that DT). After computing the complex ratio of this received value divided by the hard decision value, they will be "received", for pseudo-pilot purposes, at (1,0) ideally, too. This complex ratio of received DT value divided by the hard decision value is the pseudo-pilot tone value, and is treated as a regular pilot tone value after it is qualified (if a qualification operation or stage is employed). The unweighted residual channel gain error for this frame may be estimated as:

Channel gain error estimate={{Sum(over all pilot tones and qualified pseudo-pilot tones) of $x_{ai}$} divided by {the number of such pilot tones and qualified pseudo-pilot tones}}−1.0.

For example, if the ratio computed above provides a value of 0.98, then the difference provides −0.02, and this corresponds to the channel gain being 2% lower than the gain compensation applied. This channel gain error estimate so derived can be used to update the channel gain estimate for the receiver.

The pilot tones and qualified pseudo-pilot tones can be adjusted by this most recent information about the channel and the channel gain by multiplying each PT (including any qualified pseudo-pilot tones, hereby implied when writing "PT") by 1/0.98 in this example. This provides for gain-normalized estimates of the most recent data which may be used for subsequent channel estimation; this normalization of the PTs "takes out" the effect of gain variation over time from the subsequent channel estimation. By performing this normalization, and thus removing the time-varying overall (across the entire channel) gain variation from all the data used to perform channel estimation, the compensation of time-varying gain variation is separated between (1) the channel gain compensation, or gain tap, and (2) the frequency dependent channel estimation (which also can vary in time, but the overall gain is removed). As can be seen in this embodiment, the frequency independent (i.e., flat frequency response)/time varying gain of the communication channel may be separated from frequency selective channel estimation where the relative gains and phases among the tones may change.

If the most recently developed channel gain error, 0.98 in the example, is to be "backed out" for the DTs in the just-received frame, then the received DT values (after a first compensation of the channel was applied) are multiplied by 1/0.98. This causes the most recent frame of DT's to be completely normalized for overall channel gain. These completely normalized values may be applied to the slicer for updated hard (and soft) decision determinations. The process of determining qualified pseudo-pilot tones may be performed again (in an iterative process), all the way through to making a new stage of slicer inputs and corresponding hard decisions generated there from, and these iterations may continue a set number of times, or until no further changes develop, or a combination, or some other criteria (such as overall error power) is satisfied.

A channel estimate is produced from the PT data described above, and this channel estimate is the residual channel estimate. In a noise free and distortion free communication channel, a new channel estimate may be computed as follows:

new channel estimate($n$)=previous channel estimate ($n-1$)+residual channel estimate($n$)

where n corresponds to the current frame, and n−1 corresponds to the previous frame.

Note that this channel estimate may be in the time domain, frequency domain, or in the event of an orthogonal signaling scheme other than OFDM, for example S-CDMA, the channel estimate domain of this calculation may be the projection onto the signal space; in other words the channel estimate above may be represented as coefficients whose inverses are multiplicatively applied to each signal prior to entering the slicer to apply the channel compensation. Because of noise and other sources of degradation, in general, it may not be desirable directly to add the residual channel estimate to the previous channel estimate.

Alternatively, the residual channel estimate can be evaluated and qualified, and/or a weighting developed for the residual channel estimate, based on a wide variety of possible criteria. Using the evolution of the previous channel estimates and the residual channel estimates (e.g., based on their histories), and any qualification, a new channel estimate could be produced, and ready for application to subsequent received frames. Application of the updated/new channel estimate could also be applied to the recently received frame in an iterative approach.

One possible criterion of qualifying and weighting a residual channel estimate entails weighting according to the total error power from the slicer for all the DTs and PTs of the frame, wherein larger error power could result in lower weighting compared to other residual channel estimates derived from other frames. Other criteria of qualifying and weighting a residual channel estimate may be similar to that just described except only the PT slicer error powers would be used. Another criteria of qualifying and weighting a residual channel estimate may be to compute the sum of the weighted power of each of the coefficients (or a subset of the coefficients) in the residual channel estimate (in time domain, frequency domain, or other), weighted based on the corresponding channel estimate coefficient. For example, this may involve dividing the residual channel estimate with the magnitude (or magnitude squared) of its corresponding channel estimate coefficient.

Figure 4:
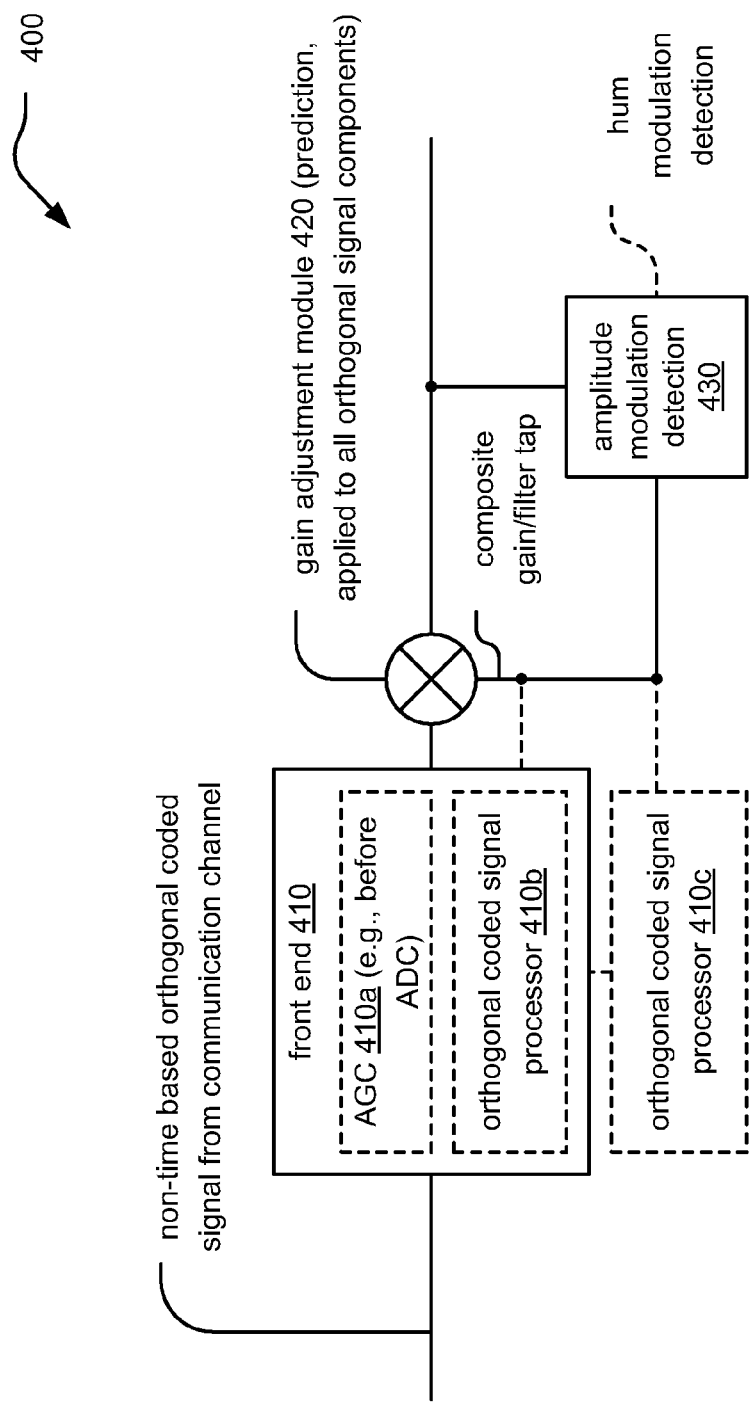
FIGS. 4, 5, and 6 illustrates alternative embodiments of an apparatus that processes a non-time based orthogonal coded signal to effectuate compensation for undesired amplitude modulation therein.
Figure 5:
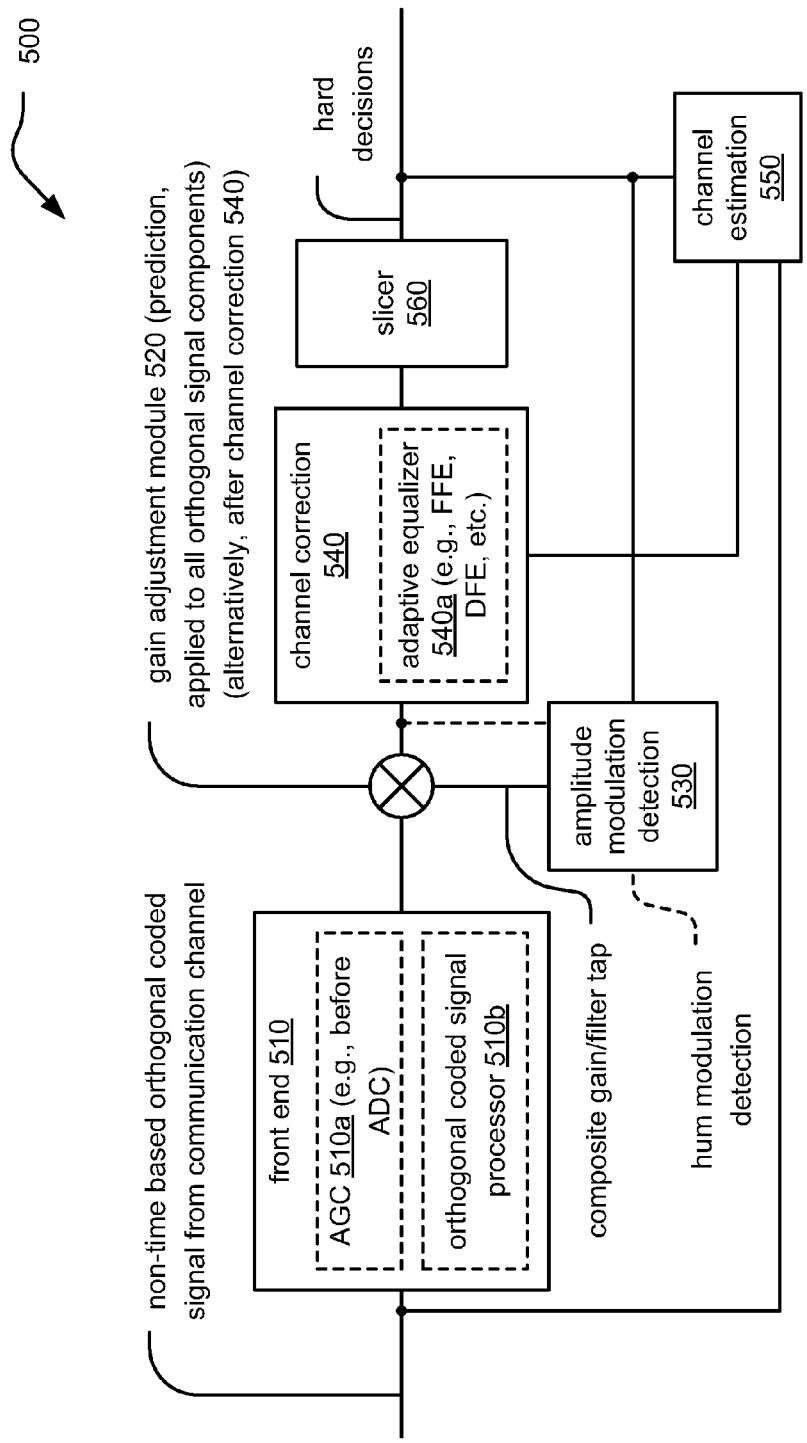
Figure 6:
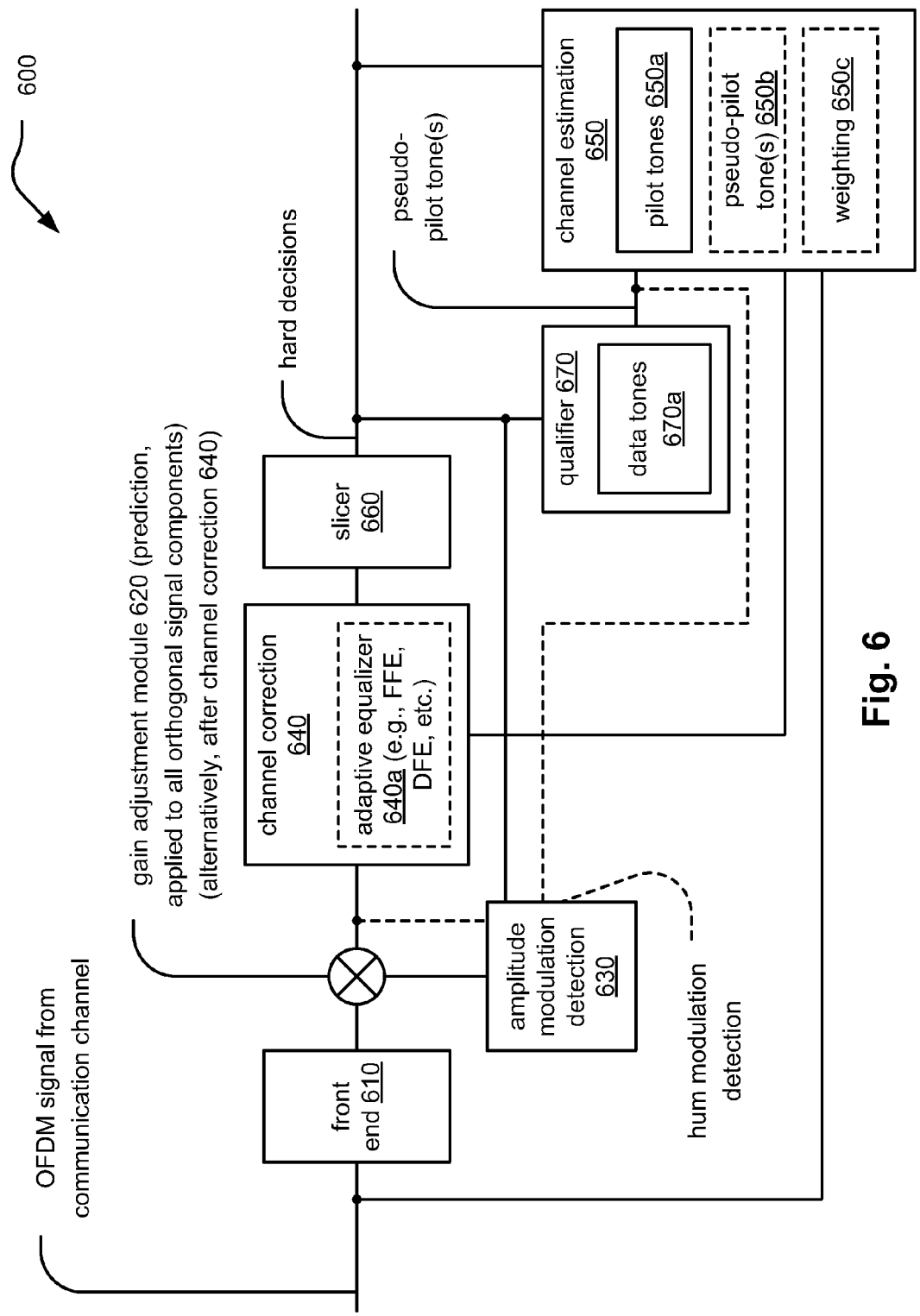

FIGS. 4, 5, and 6 illustrates alternative embodiments of an apparatus that processes a non-time based orthogonal coded signal to effectuate compensation for undesired amplitude modulation therein.

Referring to apparatus 400 of FIG. 4, a non-time based orthogonal coded signal is received from a communication channel and is processed initially by a front end module 410. The front end module 410 may include an adaptive gain control (AGC) module 410*a*, which may be implemented within the front end module 410 before any module that performs digital sampling (e.g., such as an analog to digital converter (ADC)).

The front end module 410 may perform any necessary pre-processing operations including gain adjustment, filtering, frequency conversion digital sampling, etc. as may be performed within an analog front end (AFE) module.

The front end module includes an orthogonal coded signal processor 410*a*, or the front end module 410 may alternatively be coupled to an orthogonal coded signal processor 410*c*. The orthogonal coded signal processor 410*a* or 410*b* performs appropriate processing of its received signal to extract the appropriate signal portion intended for the apparatus 400. For example, as described with respect to other embodiments, the orthogonal coded signal processor 410 may be implemented as an OFDM processor, a CDMA processor, or an S-CDMA processor. Generally speaking, the orthogonal coded signal processor 410 may alternatively be implemented generally as any appropriate other type of orthogonal coded signal processor (i.e., that employs the appropriate non-time based orthogonal signaling scheme to extract the appropriate signal portion intended for the apparatus 400).

The front end module processes and identifies the appropriate orthogonal signal components within the signal received from the communication channel (e.g., pilot tones and/or data tones as in the context of an OFDM signal). A gain adjustment module 420 processes the signal output from the front end module 410. The gain adjustment module 420 employs prediction, based on a tracked amplitude modulation of the signal (such as provided by an amplitude modulation detection module 430, which may be performed by the amplitude modulation detection module 430 using one or more of the hard decisions and/or one or more of the errors terms (e.g., such as may be generated and/or output from a slicer, such as by building and keeping a history of such one or more of the hard decisions and/or one or more of the errors terms as also described elsewhere herein, etc.)), to compensate for amplitude modulation across all orthogonal signal components within a predetermined portion of the signal. For example, this predetermined portion of the signal may be a single frame of the signal, a number of frames of the signal, or it may be a sub-portion of a frame. In addition, it is noted that the compensation for the amplitude modulation that is applied across all orthogonal signal components of the signal can adjust intra-frame (i.e., dynamically compensate for any amplitude modulation within and during any one particular frame).

Moreover, with respect to prediction, in certain embodiments, the amplitude modulation is relatively periodic and predictable. For example, in the context of hum modulation (e.g., such as that incurred by various electronic devices within a communication system that perform some type of signal rectification of an AC signal thereby generating a DC signal, and having 60 Hz or 50 Hz related spectral components), this type of amplitude modulation may have relatively predictable characteristics. Particularly when it is noted that this amplitude modulation (which may be hum modulation) is particularly repeatable, periodic, etc., then a relatively high degree of certainty can be assumed when applying compensation to a current or future portion of the signal based on the tracked amplitude modulation (hum modulation) that has been tracked and monitored during a prior/previous portion of the signal.

The amplitude modulation detection module 430 monitors and tracks the amplitude modulation of the signal output from the gain adjustment module 420. The amplitude modulation detection module 430 may also employ one or more of the hard decisions and/or one or more of the errors terms (e.g., such as may be generated and/or output from a slicer, associated respectively with the hard decisions, as also described with respect to other embodiments and/or diagrams herein) to monitor and track the amplitude modulation of the signal. The amplitude modulation detection module 430 builds and keeps a history of any amplitude modulation (e.g., such as within a memory therein or coupled thereto). In addition, the amplitude modulation detection module 430 may also receive and provide information directly to/from the orthogonal coded signal processor 410a or 410b.

Referring to apparatus 500 of FIG. 5, a non-time based orthogonal coded signal is received from a communication channel and is processed initially by a front end module 510. The front end module 510 may also include AGC module 510a, which may be implemented within the front end module 510 before any module that performs digital sampling (e.g., such as an ADC). The front end module 510 may perform any necessary pre-processing operations including gain adjustment, filtering, frequency conversion digital sampling, etc. as may be performed within an AFE module.

The front end module includes an orthogonal coded signal processor 510a that performs appropriate processing of its received signal to extract the appropriate signal portion intended for the apparatus 500. For example, as described with respect to other embodiments, the orthogonal coded signal processor 410 may be implemented as an OFDM processor, a CDMA processor, an S-CDMA processor, or any appropriate other type of orthogonal coded signal processor (i.e., that employs the appropriate non-time based orthogonal signaling scheme to extract the appropriate signal portion intended for the apparatus 500).

A gain adjustment module 520 processes the signal output from the front end module 510. The gain adjustment module 520 employs prediction, based on a tracked amplitude modulation of the signal (such as provided by an amplitude modulation detection module 530, which may be performed by the amplitude modulation detection module 530 using one or more of the hard decisions and/or one or more of the errors terms (e.g., such as may be generated and/or output from slicer 560, such as by building and keeping a history of such one or more of the hard decisions and/or one or more of the errors terms as also described elsewhere herein, etc.)), to compensate for amplitude modulation across all orthogonal signal components within a predetermined portion of the signal. For example, this predetermined portion of the signal may be a single frame of the signal, a number of frames of the signal, or it may be a sub-portion of a frame. In addition, it is noted that the compensation for the amplitude modulation that is applied across all orthogonal signal components of the signal can adjust intra-frame (i.e., dynamically compensate for any amplitude modulation within and during any one particular frame). It is noted that the gain adjustment module 520 could alternatively be located after the channel correction module 540 in other embodiments.

Moreover, with respect to prediction, in certain embodiments, the amplitude modulation is relatively periodic and predictable. For example, in the context of hum modulation (e.g., such as that incurred by various electronic devices within a communication system that perform some type of signal rectification of an AC signal thereby generating a DC signal, and having 60 Hz or 50 Hz related spectral components), this type of amplitude modulation may have relatively predictable characteristics. Particularly when it is noted that this amplitude modulation (which may be hum modulation) is particularly repeatable, periodic, etc., then a relatively high degree of certainty can be assumed when applying compensation to a current or future portion of the signal based on the tracked amplitude modulation (hum modulation) that has been tracked and monitored during a prior/previous portion of the signal.

The amplitude modulation detection module 530 monitors and tracks the amplitude modulation of the signal output from the gain adjustment module 520. The amplitude modulation detection module 530 may also employ one or more of the hard decisions and/or one or more of the errors terms (e.g., such as may be generated and/or output from slicer 560, associated respectively with the hard decisions, as also described with respect to other embodiments and/or diagrams herein) to monitor and track the amplitude modulation of the signal. The amplitude modulation detection module 530 builds and keeps a history of any amplitude modulation (e.g., such as within a memory therein or coupled thereto).

A channel correction module 540 (which may be implemented as an adaptive equalizer 540a such as a decision feedback equalizer (DFE) and/or a feed forward equalizer (FFE)) compensates for any channel effects within the received signal. In some respects, the channel correction module 540 can be viewed as effectuating an inverse channel transfer function with respect to the channel transfer function of the communication channel by which the non-time based orthogonal coded signal is received. The channel estimate employed by the channel correction module 540 may be predetermined (e.g., a preliminary channel estimate) or adaptively determined (as by channel estimation module 550). The channel estimation module 550 may employ any of a variety of means to calculate a channel estimate (e.g., using hard decisions associated with various orthogonal signal components of the non-time based orthogonal coded signal, averaging among multiple channel estimates, etc).

A slicer module 560 processes the signal that is output from the channel correction module 540 thereby generating hard decisions and associated error terms. Any hard decision also has an associated error term as well (e.g., for a data tone in the context of an OFDM signal, the associated error term being the difference between the actual symbol value and the symbol value associated with a constellation point to which it is mapped).

From the slicer module 560, these hard decisions are provided to the channel estimation module 550. The channel estimation module 550 employs the hard decisions output from the slicer module 560, and also may employ the originally received signal provided to the front end module 510, in making a channel estimate of the communication channel from which the non-time based orthogonal signal is received. As is also described in other embodiments herein, various forms of weighting (e.g., of frames, multiple frames, portions of a frame, of orthogonal signal components, channel estimates, etc.) may be employed as well when making the channel estimate.

Referring to apparatus 600 of FIG. 6, an OFDM signal is received from a communication channel and is processed initially by a front end module 610. The front end module 610 may perform any necessary pre-processing operations including gain adjustment, filtering, frequency conversion digital sampling, etc. as may be performed within an AFE module.

A gain adjustment module 620 processes the OFDM signal output from the front end module 610. The gain adjustment module 620 employs prediction, based on a tracked amplitude modulation of the OFDM signal (such as provided by an amplitude modulation detection module 630, which may be performed by the amplitude modulation detection module 630 using one or more of the hard decisions and/or one or more of the errors terms (e.g., such as may be generated and/or output from slicer 660, such as by building and keeping a history of such one or more of the hard decisions and/or one or more of the errors terms as also described elsewhere herein, etc.)), to compensate for amplitude modulation across all tones (e.g., pilot tones and/or data tones) within a predetermined portion of the OFDM signal. It is noted that the gain adjustment module 620 could alternatively be located after channel correction module 640 in other embodiments.

Moreover, with respect to prediction, in certain embodiments, the amplitude modulation is relatively periodic and predictable (e.g., with respect to hum modulation as described elsewhere herein).

The amplitude modulation detection module 630 monitors and tracks the amplitude modulation of the OFDM signal output from the gain adjustment module 620. The amplitude modulation detection module 630 may also employ one or more of the hard decisions and/or one or more of the errors terms (e.g., such as may be generated and/or output from slicer 660, associated respectively with the hard decisions, as also described with respect to other embodiments and/or diagrams herein) to monitor and track the amplitude modulation of the signal. The amplitude modulation detection module 630 builds and keeps a history of any amplitude modulation (e.g., such as within a memory therein or coupled thereto).

A channel correction module 640 (which may be implemented as an adaptive equalizer 640a such as a decision feedback equalizer (DFE) and/or a feed forward equalizer (FFE)) compensates for any channel effects within the received OFDM signal. In some respects, the channel correction module 640 can be viewed as effectuating an inverse channel transfer function with respect to the channel transfer function of the communication channel by which the non-time based orthogonal coded signal is received. The channel estimate employed by the channel correction module 640 may be predetermined (e.g., a preliminary channel estimate) or adaptively determined (as by channel estimation module 650). The channel estimation module 650 may employ any of a variety of means to calculate a channel estimate (e.g., using hard decisions associated with various orthogonal signal components of the non-time based orthogonal coded signal, averaging among multiple channel estimates, etc).

A slicer module 660 processes any pilot tones and data tones within the OFDM signal that is output from the channel correction module 640 thereby generating hard decisions and associated error terms. The output of the slicer 660, for each data and pilot tone, is fed back to a channel estimation module 650 for comparison with the input OFDM signal to determine the channel estimate (e.g., the channel impulse response) Any hard decision generated by processing a pilot tone or a data tone has an associated error term as well (e.g., for a data tone, the error term being the difference between the actual symbol value and the symbol value associated with a constellation point to which it is mapped; for a pilot tone, the error term being the difference between the actual pilot tone symbol's value and the predetermined symbol value associated with a predetermined constellation point to which the pilot tone is mapped and corresponds).

From the slicer module 660, these pilot tone hard decisions are provided to the channel estimation module 650 (as shown by reference numeral 650a therein). A qualifier module 670 processes one of more data tone hard decisions output from the slicer module 660 (as shown by reference numeral 670a within the qualifier module 670) to identify one or more pseudo-pilot tone hard decisions. This identification of a pseudo-pilot tone hard decision may be made when the error term corresponding to a data tone hard decision is less than a predetermined threshold value (or an adaptively updated/adjusted threshold value in alternative embodiments). Also, when a data tone hard decision qualifies based on a constraint condition being employed for qualification, the data tone hard decision may be processed using an Inverse Fourier Transform (IFT) or Inverse Fast Fourier Transform (IFFT) thereby generating the pseudo-pilot tone, so that it may be employed simply as if it was a pilot tone.

The channel estimate module 650 employs the hard decisions associated with pilot tones 650a and one or more pseudo-pilot tone hard decisions 650b in making a channel estimate of the communication channel from which the OFDM signal is received. If desired, one or more pilot tones and/or pseudo-pilot tones may be employed by the amplitude modulation detection module 630 to track the amplitude modulation within the signal. As is also described in other embodiments herein, various forms of weighting (e.g., of frames, of tones, etc.) may be employed as well when making the channel estimate (as shown by reference numeral 650c).

As an illustrative example relating to non-time based orthogonal signaling other than OFDM, the operation as described with reference to FIG. 6, may be applied with "unused spreading codes" of S-CDMA carrying predetermined non-zero values, thus acting as "pilot tones". Further, the multiplication of data by the spreading codes to create the transmitted samples is equivalent to a matrix multiply, and corresponds to the IFT (or IFFT) in the OFDM description, and the multiplication of the received samples by the despreading codes can be envisioned as a matrix multiply corresponding to computation of the Fourier Transform (FT) or Fast Fourier Transform (FFT) in an OFDM receiver. Multiplications with these matrices in S-CDMA are the "replacements" for the corresponding operations between the time and frequency domains described for the OFDM processing with reference to FIG. 6, but with the corresponding domains being the time domain and the code domain for S-CDMA. With S-CDMA one embodiment would be to additionally incorporate a true frequency domain representation of the channel estimate, using transformation from the time domain, or possibly the code domain, S-CDMA signals.

Figure 7:
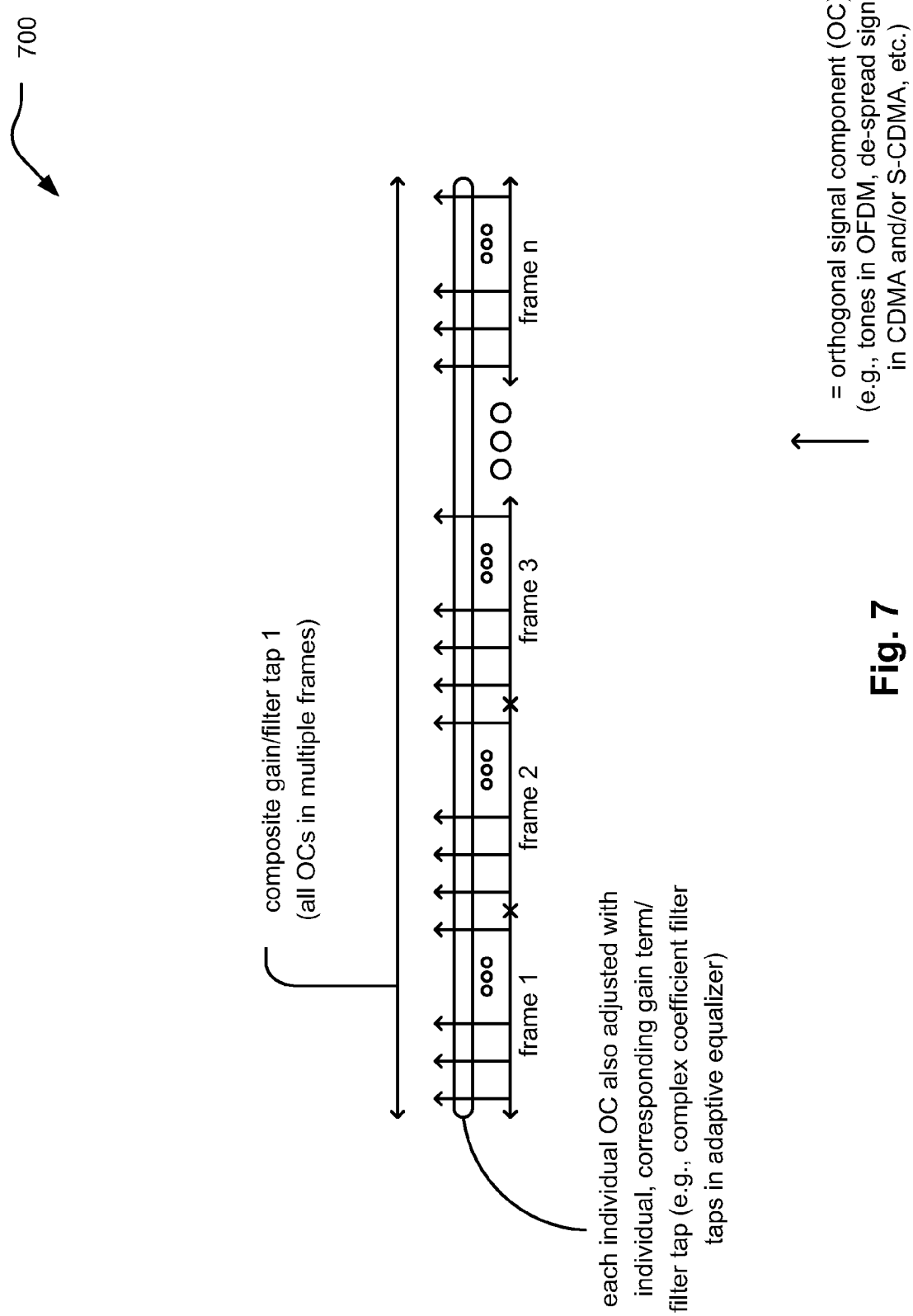
FIG. 7 illustrates an embodiment of a composite gain/filter tap being determined using various orthogonal signal components of a non-time based orthogonal coded signal.

FIG. 7 illustrates an embodiment 700 of a composite gain/filter tap being determined using various orthogonal signal components of a non-time based orthogonal coded signal. This diagram shows how a composite gain or filter tap (shown as composite gain/filter tap 1 in the diagram) is applied across all orthogonal signal components within a predetermined portion of a non-time based orthogonal coded signal, and namely in this embodiment 700, across a number of frames of the signal.

In addition, each individual orthogonal component of the signal is adjusted with an individual, corresponding gain term or filter tap (e.g., such as a complex coefficient filter tap as may be employed by an adaptive equalizer). Again, each individual orthogonal component of the signal has a corresponding separate and distinct gain term or filter tap applied thereto.

There are therefore at least two separate gain or filter taps applied to each orthogonal signal component. Firstly, the composite gain or filter tap is applied across all orthogonal signal components, so each individual orthogonal component of the signal is adjusted with the composite gain or filter tap. Secondly, a separate and distinct gain term or filter tap is applied to each individual orthogonal signal component.

As described within other embodiments, it is noted that the non-time based orthogonal coded signal referred to in this diagram may be of a variety of types (e.g., orthogonal frequency division multiplexing (OFDM), synchronous code division multiple access (S-CDMA), code division multiple access (CDMA), etc.), and as such, an orthogonal signal component may a tone within a corresponding OFDM signal, a de-spread signal within a CDMA and/or S-CDMA signal, etc.

Figure 8:
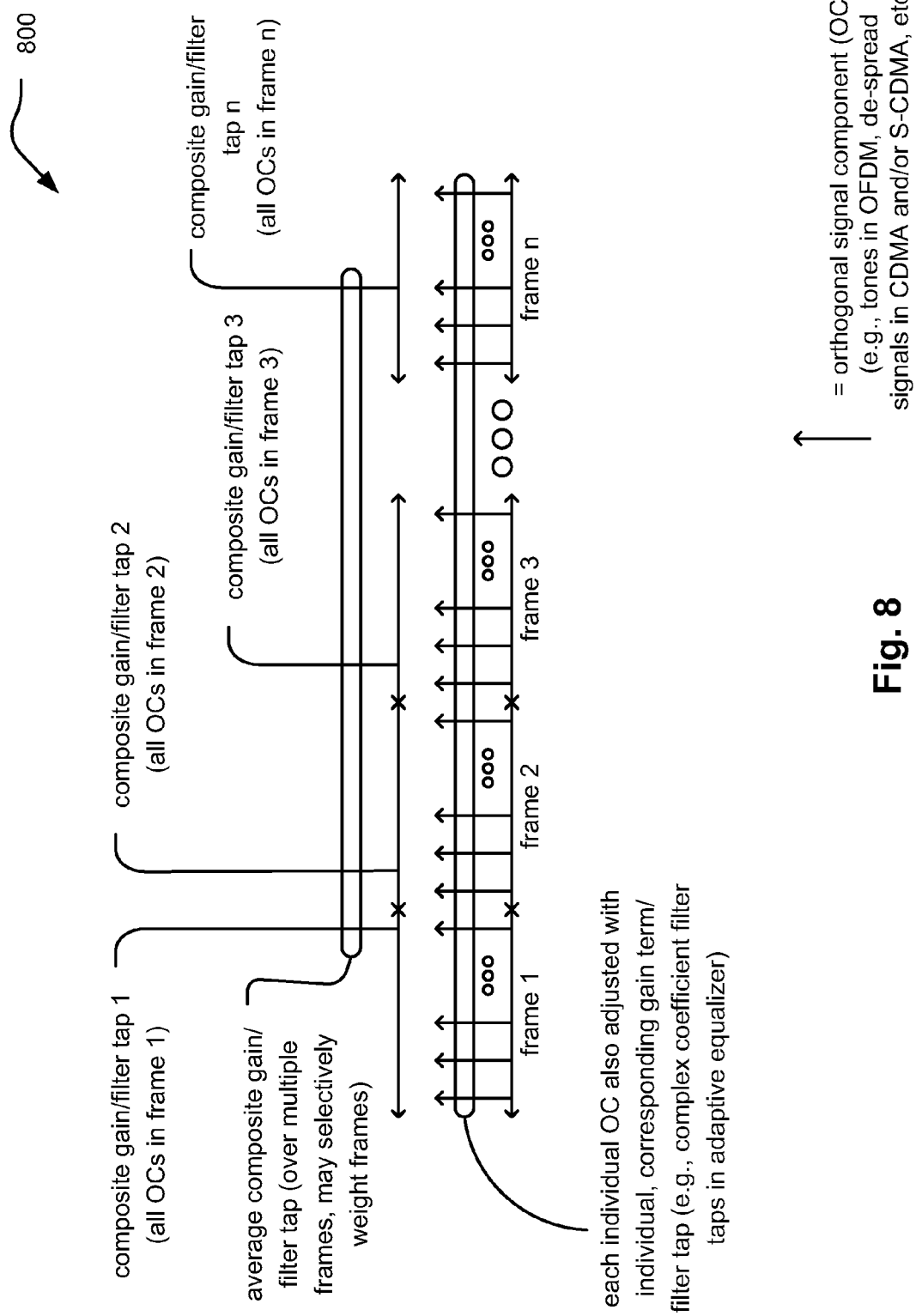
FIG. 8 illustrates an embodiment of multiple composite gains/filter taps being determined using various orthogonal signal components of a non-time based orthogonal coded signal.

FIG. 8 illustrates an embodiment 800 of multiple composite gains/filter taps being determined using various orthogonal signal components of a non-time based orthogonal coded signal. This diagram shows how each respective frame employs a different and distinct composite gain or filter tap. This may be viewed as employing a different and distinct composite gain or filter tap for each frame within a signal (e.g., shown as composite gain/filter tap 1 applied to all orthogonal components in frame 1, composite gain/filter tap 2 applied to all orthogonal components in frame 2, and so on).

In addition, an average composite gain or filter tap may be computed over multiple frames, and certain of those frames may be selectively weighted as well (e.g., as function of time/memory, on an individual frame's composite gain or filter tap deviation from the average composite gain or filter tap, etc.).

Figure 9:
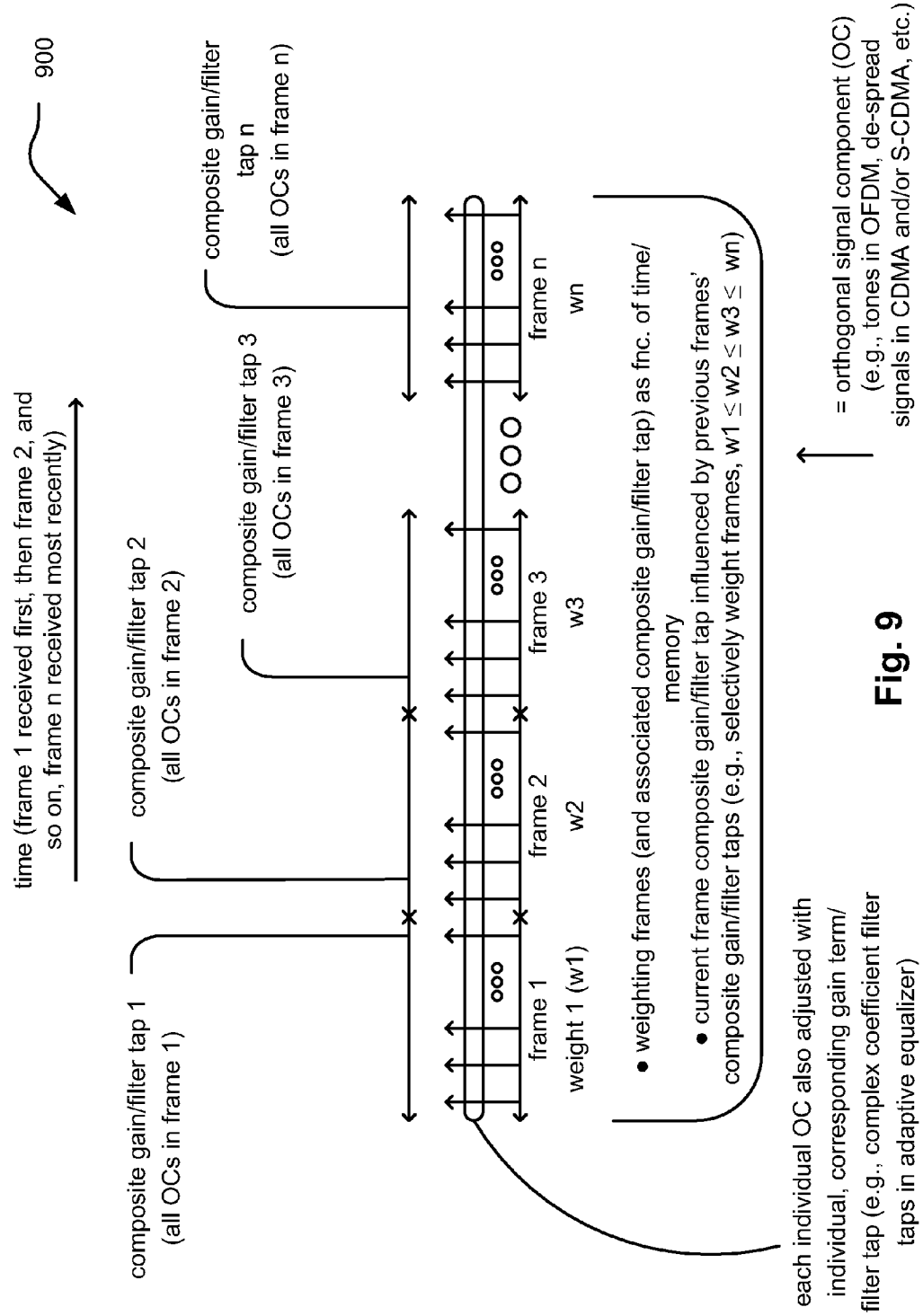
FIG. 9 illustrates an alternative embodiment of multiple composite gains/filter taps being determined, and selectively weighted, using various orthogonal signal components of a non-time based orthogonal coded signal.

FIG. 9 illustrates an alternative embodiment 900 of multiple composite gains/filter taps being determined, and selectively weighted, using various orthogonal signal components of a non-time based orthogonal coded signal. This diagram also shows how each respective frame employs a different and distinct composite gain or filter tap. This may be viewed as employing a different and distinct composite gain or filter tap for each frame within a signal (e.g., shown as composite gain/filter tap 1 applied to all orthogonal components in frame 1, composite gain/filter tap 2 applied to all orthogonal components in frame 2, and so on).

In this diagram, each frame is weighted as a function of the time/memory. For example, this diagram shows that frame 1 is received first, then frame 2, and so on up to frame n. The weighting of channel estimates associated with each frame is based in one embodiment on how recently it is received in the part. For example, the composite gain/filter tap associated with the most recently received frame (e.g., frame n) has the largest weight. The weights applied to the composite gains/filter taps associated with each of the other previously received frames are less than or equal to the weight applied to the composite gain/filter tap associated with the current (i.e., most recently received) frame.

In another embodiment, a frame may be excluded from the computation of channel estimates and composite gain estimates if it has an associated error power which is above a threshold, which threshold may be related to (or derived from or adjusted by) error power of other frames, or set absolutely, or set depending on other characteristics of the actual or desired communications (e.g., adaptively determined based on various parameters). In yet another embodiment, a frame may be weighted by a combination of both its quality (e.g., as measured by error power) and how recently it was received. This may be viewed as being a two-dimensional weighting, in that, both time (e.g., received) and a quality parameter are both employed in the weighting.

As with other embodiments herein, if desired with respect to this diagram, an average composite gain/filter tap may be computed using multiple composite gain/filter taps from any two or more frames. This diagram shows an averaged/weighted composite gain/filter tap being calculated using the corresponding composite gains/filter taps from each of frames 1 through n; however, it is noted that any two composite gains/filter taps corresponding to any two frames may be employed to calculate an averaged/weighted composite gain/filter tap for those two frames. Analogously, it is noted that any n composite gains/filter taps corresponding to any n frames may be employed to calculate an averaged/weighted composite gain/filter tap for those n frames.

In yet another embodiment, by tracking the residual channel estimate (e.g., from frame to frame on a per frame basis), a relatively small difference between successive residual channel estimates compared to the residual channel estimates themselves (e.g., their average) could be indicative of an abrupt channel change before the previous frame. This processing approach could also be extrapolated to include more frames and even more complicated metrics.

Employing composite gain compensation (as described in various embodiments herein) allows for any rapid dynamics and overall gain variation to be processed and compensated separately from the frequency selective channel correction/compensation (e.g., which is applied individually to the orthogonal signal components). In other words, the composite gain variation is processed and compensated separately from the frequency selective channel correction/compensation.

In the case of more slowly varying frequency selective channel induced effects (e.g., characteristics that may affect a signal transmitted through the communication channel), this allows more averaging for those frequency selective channel induced effects and thus more accurate compensation for them is possible that is allowed when composite gain variation is not treated separately from the frequency selective channel induced effects.

However, in certain embodiments, with a longer averaging time for the frequency selective channel induced effects, it may be desirable to identify an abrupt, significantly large channel change (e.g., as determined by some threshold) within the frequency selective channel induced effects. With the detection of such an abrupt change, a communication device (e.g., a receiver) may discard the channel estimates prior to that detected channel change. Alternatively, rather than discarding those channel estimates made prior to the detected channel change, those channel estimates may be appropriately weighted in a manner such as to reduce their contribution (e.g., lowly weighted).

Moreover, in the context of OFDM, rapidly varying composite gain can be accurately estimated with relatively fewer frames when it is separated from the frequency selective channel estimate because each pilot tone (PT) contributes to the estimation of the composite gain as compared to frequency selective channel estimation in which each individual PT is used to estimate the channel response at its particular pilot tone frequency. When these two forms of compensation are not separated as described herein, then the channel response estimate at a particular pilot tone frequency is derived only from observation of that particular pilot tone; therefore, accruing a number of observations inherently requires many frames. In addition, while the use of pseudo-pilot tones, and/or redundant pilot tones, allows for reduction in the number of frames required for a given accuracy of channel estimation, the principle of separation as described herein still provides greater benefit.

Figure 10:
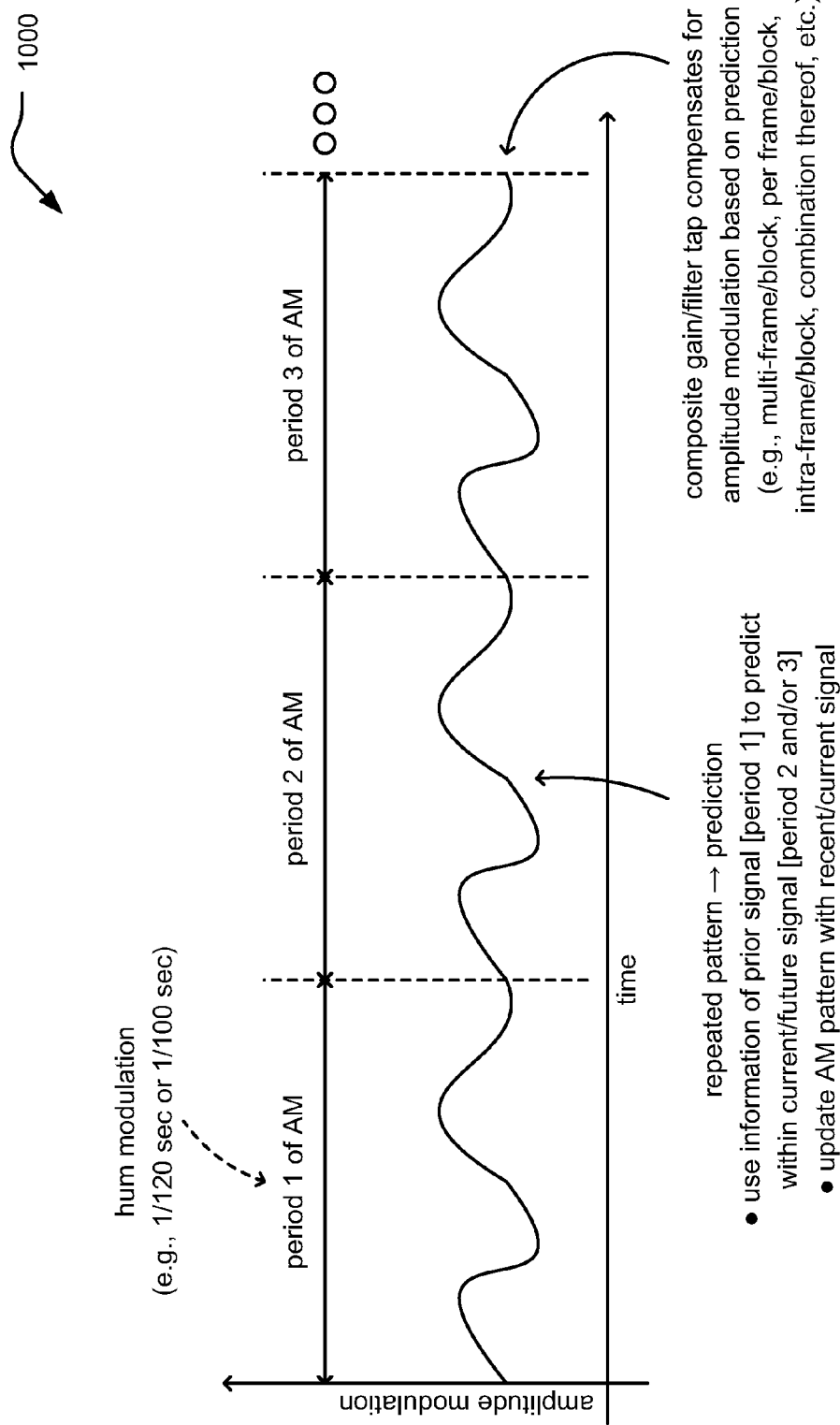
FIG. 10 illustrates an embodiment of amplitude modulation tracking.

FIG. 10 illustrates an embodiment 1000 of amplitude modulation tracking. This diagram shows an example of what amplitude modulation of a signal may look like. From certain perspectives, this may be viewed as a modulation of an envelope of a signal that is transmitted across a communication channel. In one embodiment, when the amplitude modulation is in fact hum modulation, it may have an extremely periodic and repeatable pattern. In addition, other sources of amplitude modulation (besides hum modulation) may also have such periodic and repeatable patterns. However, in the case of hum modulation, there are typically spectral components at well known locations (e.g., 60 Hz or 50 Hz and multiples thereof).

It is noted that, generally, the pattern of the amplitude modulation may take any shape form and have any shape. It may appear to be have a random, spurious form, in that, the amplitude modulation may sometimes be generated by a number of different sources.

As can be seen in this diagram, the amplitude modulation is repeated and has a corresponding period, that is depicted as having period 1, period 2, period 3, and so on in the diagram. Clearly, each of periods 1, 2, 3, and so on are the same when the amplitude modulation repeats itself. Because the amplitude modulation is repeated, this allows prediction for applying compensation using a composite gain or filter tap to a current or future portion (e.g., single frame, multiple frames, sub-portions of a frame, etc.) of a signal based on the amplitude modulation of the signal within one or more previous portions (e.g., single frame, multiple frames, sub-portions of a frame, etc.) of the signal.

For example, in this diagram, information associated with the amplitude modulation of the signal within period 1 may be used to apply compensation to frame 2 and/or frame 3 using a composite gain or filter tap. Also, the pattern associated with the amplitude modulation may be updated/modified based on more current information available (e.g., pattern updated using most recent/current information).

Therefore, because of the periodic and repeatable nature of the amplitude modulation, prediction may be applied to compensate for the amplitude modulation within the signal based on the tracked (e.g., prior) amplitude modulation of the signal Particularly within the context of non-time based orthogonal signals, this composite gain or filter tap is applied to all orthogonal components of the signal. Also, this may be applied to the signal on a multiple frame/block basis, on a per frame/block basis, or using any combination thereof.

Figure 11:
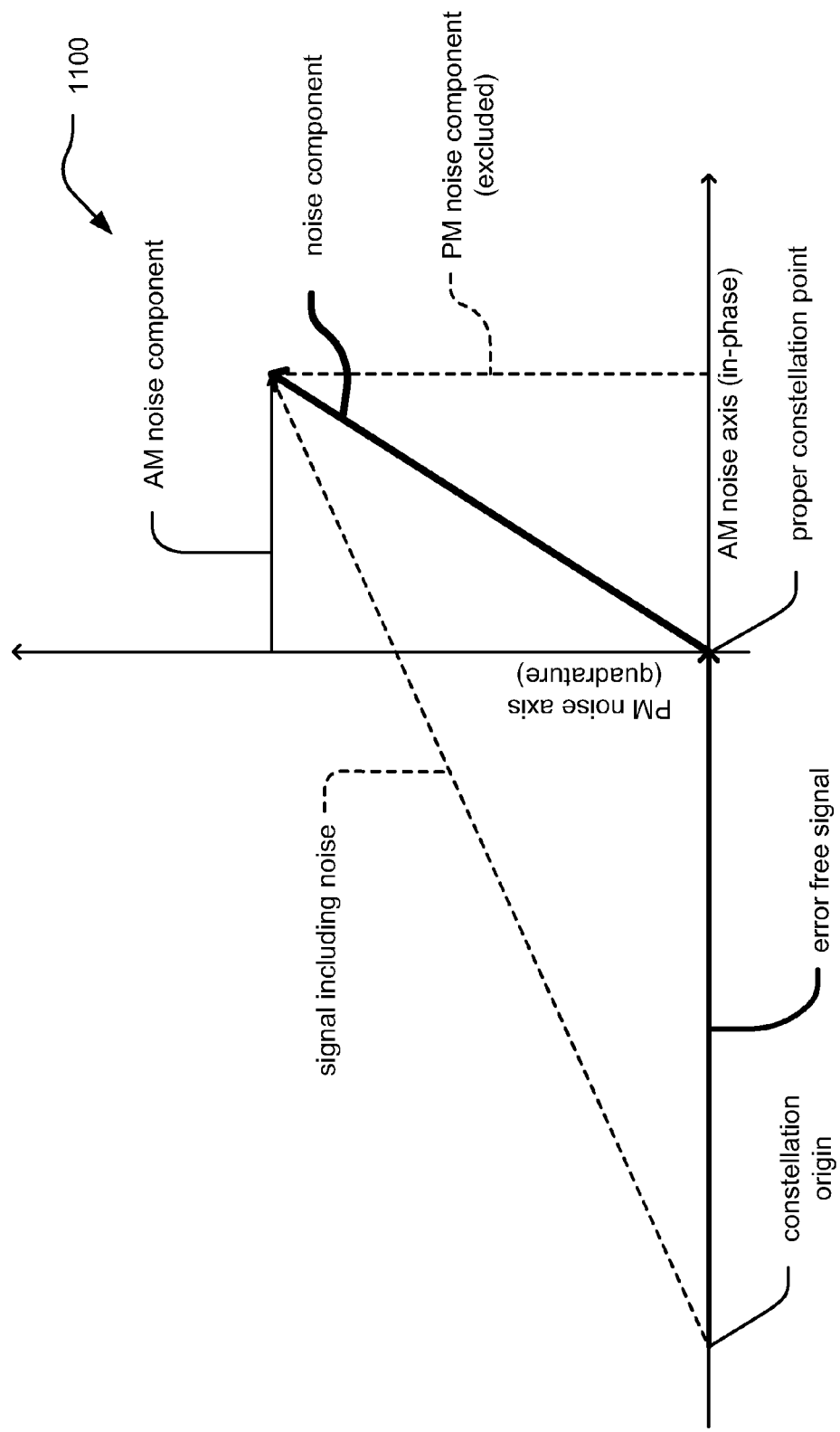
FIG. 11 illustrates an embodiment of excluding a phase modulation noise component of a signal to effectuate compensation for undesired amplitude modulation therein.

FIG. 11 illustrates an embodiment 1100 of excluding a phase modulation noise component of a signal to effectuate compensation for undesired amplitude modulation therein. Noise that deleteriously affects the signal may have an amplitude modulation (AM) noise component and a phase modulation (PM) noise component (as shown as extending from the proper constellation point to which an error free signal would align). This may be viewed as having an in-phase component and a quadrature component.

If the total energy of a noise component that contributes to amplitude modulation is taken directly, it will inherently be biased, in that, the magnitude of the noise component has a PM noise component.

In certain embodiments, an amplitude modulation detection module operates to exclude any PM phase noise component within the signal thereby ensuring that only the AM phase noise component is included.

FIG. 12A illustrates an embodiment of a method 1200a for performing compensation for undesired amplitude modulation within a signal. The method 1200a begins by tracking amplitude modulation over a first predetermined period of time, as shown in a block 1210a. Alternatively, this may operate by tracking amplitude modulation over a first one or more predetermined frames or blocks. The method 1200a then operates by employing prediction, based on the tracked amplitude modulation, to compensate for amplitude modulation over a second predetermined period of time, as shown in a block 1220a. This may involve compensating for the amplitude modulation over a second one or more predetermined frames or blocks.

FIG. 12B illustrates an alternative embodiment of a method 1200b for performing compensation for undesired amplitude modulation within a signal. The method 1200b begins by updating a tracked amplitude modulation using information of a current signal, as shown in a block 1210b. For example, a tracked amplitude modulation may be stored and currently being used to compensate for amplitude modulation within a current portion of a signal, and the current portion of the signal is also being analyzed and monitored to allow for updating of the tracked amplitude modulation for improved accuracy when applied to future portions of the signal. In addition, the updated, tracked amplitude modulation can also be applied to the current portion of the signal as well (i.e., by re-processing the current portion of the signal to compensate for amplitude modulation therein using the updated, tracked amplitude modulation).

Figures 13A, 13B:
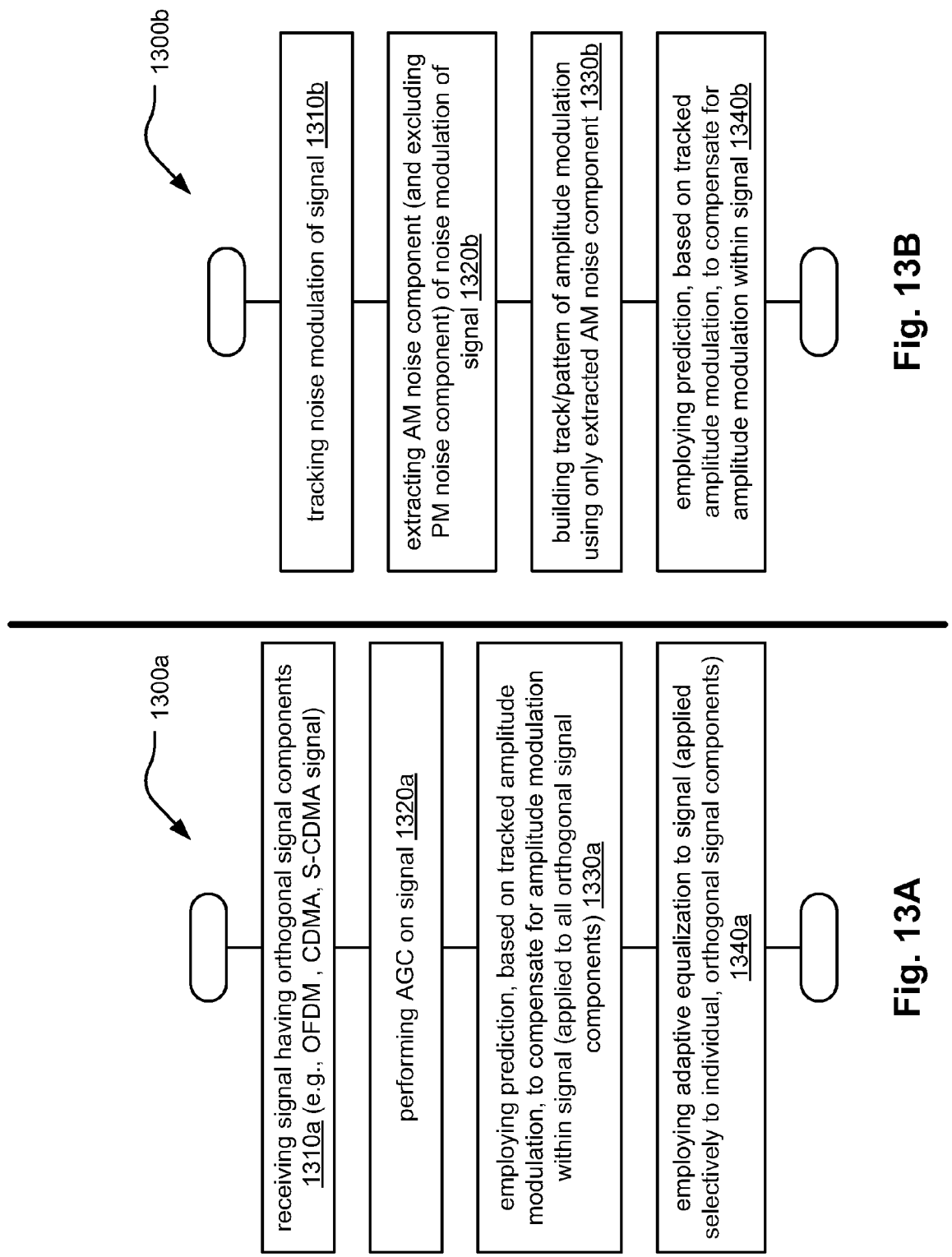
FIG. 13A illustrates an embodiment of a method for performing automatic gain control (AGC), compensating for undesired amplitude modulation by using prediction, and employing adaptive equalization to a signal.
FIG. 13B illustrates an embodiment of a method for excluding a phase modulation noise component of a signal to effectuate compensation for undesired amplitude modulation therein.

FIG. 13A illustrates an embodiment of a method 1300a for performing automatic gain control (AGC), compensating for undesired amplitude modulation by using prediction, and employing adaptive equalization to a signal. The method 1300a operates by receiving a signal having orthogonal signal components, as shown in a block 1310a. As with other embodiments described herein, the signal is a non-time based orthogonal coded signal. The non-time based orthogonal coded signal may be generated using any one of any variety of types of non-time based orthogonal coded signaling schemes (e.g., orthogonal frequency division multiplexing (OFDM), code division multiple access (CDMA), synchronous code division multiple access (S-CDMA), etc.).

The method 1300a then operates by performing automatic gain control (AGC) on the signal, as shown in a block 1320a. This may even be performed before other operations such as digital sampling of the signal.

The method 1300a then operates by employing prediction, based on a tracked amplitude modulation (e.g., a predetermined amplitude modulation, an amplitude modulation that has been tracked and monitored, etc.), to compensate for amplitude modulation within the signal, as shown in a block 1330a. This compensation is applied to all orthogonal components of the non-time based orthogonal coded signal.

Thereafter, the method 1300a operates by employing adaptive equalization to the signal, as shown in a block 1340a. This adaptive equalization is applied individually to the various, individual orthogonal components of the non-time based orthogonal coded signal. For example, each individual orthogonal component is adjusted using a corresponding complex coefficient.

FIG. 13B illustrates an embodiment of a method 1300b for excluding a phase modulation noise component of a signal to effectuate compensation for undesired amplitude modulation therein. The method 1300b operates by tracking noise modulation of a signal, as shown in a block 1310b.

As with other embodiments described herein, the signal is a non-time based orthogonal coded signal. Also as with other embodiments described herein, the non-time based orthogonal coded signal may be generated using any one of any variety of types of non-time based orthogonal coded signaling schemes (e.g., orthogonal frequency division multiplexing (OFDM), code division multiple access (CDMA), synchronous code division multiple access (S-CDMA), etc.).

The method 1300*b* then operates by extracting an amplitude modulation noise component from the noise modulation of the signal, as shown in a block 1320*b*. This effectively operates by excluding the phase modulation noise component from the noise modulation of the signal.

The method 1300*b* then operates by building a track or pattern of the amplitude modulation of the signal using only the extracted amplitude modulation noise component, as shown in a block 1330*b*.

The method 1300*b* then operates by employing prediction, based on the tracked amplitude modulation, to compensate for amplitude modulation within the signal, as shown in a block 1340*b*. This compensation is applied to all orthogonal components of the non-time based orthogonal coded signal.

It is noted that the various modules (e.g., encoding modules, decoding modules, channel correction modules, channel estimation/detection modules, slicer modules, front end modules, amplitude modulation detection modules, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An apparatus comprising:
   a front end module configured to receive a signal from a communication channel that is amplitude modulation affected, wherein the signal is a non-time based orthogonal coded signal having a plurality of orthogonal signal components;
   a gain adjustment module, coupled to the front end module, configured to use prediction, based on a tracked amplitude modulation within the signal, to compensate for amplitude modulation across all of the plurality of orthogonal signal components within a predetermined portion of the signal;
   a slicer module configured to process the signal output from the gain adjustment module to generate a plurality of hard decisions and a plurality of error terms; and
   an amplitude modulation detection module, coupled to the gain adjustment module, configured to employ at least one of the plurality of hard decisions and the plurality of error terms to track the amplitude modulation within the signal.

2. The apparatus of claim 1, wherein the apparatus is implemented within a cable system, and the amplitude modulation affecting the communication channel is hum modulation.

3. The apparatus of claim 1, wherein the non-time based orthogonal coded signal is an orthogonal frequency division multiplexing (OFDM) signal, or a synchronous code division multiple access (S-CDMA) signal, or a code division multiple access (CDMA) signal.

4. The apparatus of claim 1 further comprising:
   a communication device operative within at least one of a wireless communication system, a wired communication system, and an optical communication system.

5. The apparatus of claim 1, wherein the gain adjustment module is configured to apply a composite filter tap to all of the plurality of orthogonal signal components within the predetermined portion of the signal.

6. The apparatus of claim 1 further comprising:
   an adaptive equalizer, having a plurality of filter taps and coupled to the gain adjustment module, configured to compensate for channel effects incurred within the signal by the communication channel; and wherein:
   the adaptive equalizer is configured to apply each respective filter tap of a plurality of filter taps to one corresponding orthogonal signal component of the plurality of orthogonal signal components.

7. The apparatus of claim 1, wherein the signal is partitioned into a plurality of frames, and the gain adjustment module to perform intra-frame compensation for the amplitude modulation.

8. The apparatus of claim 1, wherein the signal is partitioned into a plurality of frames, and the gain adjustment module to perform compensation for the amplitude modulation on a per-frame basis.

9. The apparatus of claim 1 further comprising:
an automatic gain control (AGC) module, implemented within the front end module, configured to adjust a level of the signal received from the communication channel based on a previously calculated average level of the signal.

10. The apparatus of claim 1, wherein the signal includes an amplitude modulation noise component and a phase modulation noise component; and
when tracking the amplitude modulation within the signal, the amplitude modulation detection module is configured to exclude the phase modulation noise component of the signal.

11. The apparatus of claim 1 further comprising:
a qualifier module coupled to the amplitude modulation detection module, wherein the signal is an orthogonal frequency division multiplexing (OFDM) signal having a plurality of pilot tones and a plurality of data tones; and wherein:
the slicer module is configured to generate a plurality of hard decisions and a plurality of error terms based on the plurality of data tones such that each of the plurality of hard decisions and each of the plurality of error terms corresponding to a respective one of the plurality of data tones;
the qualifier module is configured to identify one of the plurality of data tones as a pseudo-pilot tone when its corresponding error term less than or equal to a predetermined threshold value; and
the amplitude modulation detection module is configured to employ the plurality of pilot tones and the pseudo-pilot tone to track the amplitude modulation within the signal.

12. The apparatus of claim 1 further comprising:
a cable modem or a set top box (STB) coupled to a cable system.

13. An apparatus comprising:
a front end module configured to receive a signal from a communication channel, wherein the signal is a non-time based orthogonal coded signal having a plurality of orthogonal signal components, and the communication channel is amplitude modulation affected;
a gain adjustment module, coupled to the front end module, configured to use prediction, based on a tracked amplitude modulation, to compensate for amplitude modulation across all of the plurality of orthogonal signal components within a predetermined portion of the signal;
an adaptive equalizer, having a plurality of filter taps and coupled to the gain adjustment module, configured to compensate for channel effects incurred within the signal by the communication channel, wherein the adaptive equalizer to apply each respective filter tap of a plurality of filter taps to one corresponding orthogonal signal component of the plurality of orthogonal signal components;
a slicer module configured to process the signal output from the gain adjustment module to generate a plurality of hard decisions and a plurality of error terms; and
an amplitude modulation detection module, coupled to the slicer module, configured to employ at least one of the plurality of hard decisions and the plurality of error terms to track amplitude modulation within the signal.

14. The apparatus of claim 13, wherein the apparatus is implemented within a cable system, and the amplitude modulation affecting the communication channel is hum modulation.

15. The apparatus of claim 13, wherein the non-time based orthogonal coded signal is an orthogonal frequency division multiplexing (OFDM) signal, or a synchronous code division multiple access (S-CDMA) signal, or a code division multiple access (CDMA) signal.

16. The apparatus of claim 13 further comprising:
the gain adjustment module configured to apply a composite filter tap to all of the plurality of orthogonal signal components within the predetermined portion of the signal.

17. The apparatus of claim 13, wherein the signal is partitioned into a plurality of frames, and the gain adjustment module to perform intra-frame compensation for the amplitude modulation.

18. The apparatus of claim 13, wherein the signal is partitioned into a plurality of frames; and further comprising:
the gain adjustment module configured to perform compensation for the amplitude modulation on a per-frame basis.

19. The apparatus of claim 13, wherein the signal includes an amplitude modulation noise component and a phase modulation noise component; and further comprising:
when tracking the amplitude modulation within the signal, the amplitude modulation detection module is configured to exclude the phase modulation noise component of the signal.

20. The apparatus of claim 13 further comprising:
a qualifier module coupled to the amplitude modulation detection module, wherein the signal is an orthogonal frequency division multiplexing (OFDM) signal having a plurality of pilot tones and a plurality of data tones;
the qualifier module configured to identify one of the plurality of data tones as a pseudo-pilot tone when its corresponding error term less than or equal to a predetermined threshold value; and
the amplitude modulation detection module configured to employ the plurality of pilot tones and the pseudo-pilot tone to track the amplitude modulation within the signal.

21. The apparatus of claim 13 further comprising:
a cable modem or a set top box (STB) coupled to a cable system.

22. An apparatus comprising:
a front end module, including an automatic gain control (AGC) module, configured to receive a signal from a communication channel, wherein the signal is an orthogonal frequency division multiplexing (OFDM) signal including a plurality of pilot tones and a plurality of data tones, the communication channel is hum modulation affected, and the AGC module is configured to adjust a level of the signal received from the communication channel based on a previously calculated average level of the signal;
a gain adjustment module, coupled to the front end module, configured to use prediction, based on a tracked hum modulation, to adjust a composite filter tap to compensate for hum modulation across all of the plurality of pilot tones and data tones within a predetermined portion of the signal;
an adaptive equalizer, having a plurality of filter taps and coupled to the gain adjustment module, configured to compensate for channel effects incurred within the signal by the communication channel, wherein the adaptive equalizer is configured to apply each respective filter tap of a plurality of filter taps to one corresponding tone of the plurality of pilot tones and data tones;

a slicer module configured to process the signal output from the gain adjustment module to generate a plurality of hard decisions and a plurality of error terms; and a hum modulation detection module, coupled to the slicer module, configured to employ at least one of the plurality of hard decisions and the plurality of error terms to track hum modulation within the signal.

23. The apparatus of claim 22, wherein the signal is partitioned into a plurality of frames; and frames, and further comprising:

the gain adjustment module configured to perform intra-frame compensation for the hum modulation.

24. The apparatus of claim 22, wherein the signal is partitioned into a plurality of frames; and further comprising:

the gain adjustment module configured to perform compensation for the hum modulation on a per-frame basis.

25. The apparatus of claim 22, wherein the signal includes an amplitude modulation noise component and a phase modulation noise component; and when tracking the hum modulation within the signal, the hum modulation detection module is configured to exclude the phase modulation noise component of the signal.

26. The apparatus of claim 22 further comprising:

a qualifier module coupled to the hum modulation detection module;

the qualifier module configured to identify one of the plurality of data tones as a pseudo-pilot tone when its corresponding error term less than or equal to a predetermined threshold value; and the hum modulation detection module configured to employ the plurality of pilot tones and the pseudo-pilot tone to track the hum modulation within the signal.

27. The apparatus of claim 22, wherein the apparatus is a cable modem or a set top box (STB) coupled to a cable system.

* * * * *

UNITED STATES PATENT AND TRADEMARK OFFICE
CERTIFICATE OF CORRECTION

PATENT NO. : 8,774,332 B2  
APPLICATION NO. : 12/340603  
DATED : July 8, 2014  
INVENTOR(S) : Kolze et al.

Page 1 of 1

It is certified that error appears in the above-identified patent and that said Letters Patent is hereby corrected as shown below:

In the Claims:
Col. 27, line 11, in claim 23: after "into", replace "a plurality of frames; and frames, and further" with --a plurality of frames; and further--

Signed and Sealed this
Nineteenth Day of May, 2015

Michelle K. Lee
*Director of the United States Patent and Trademark Office*